United States Patent
Dejanovic et al.

(10) Patent No.: US 11,397,624 B2
(45) Date of Patent: Jul. 26, 2022

(54) EXECUTION OF CROSS-LANE OPERATIONS IN DATA PROCESSING SYSTEMS

(71) Applicant: Arm Limited, Cambridge (GB)

(72) Inventors: Luka Dejanovic, Alconbury Weald (GB); Mladen Wilder, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/254,286

(22) Filed: Jan. 22, 2019

(65) Prior Publication Data

US 2020/0233726 A1 Jul. 23, 2020

(51) Int. Cl.
*G06F 9/38* (2018.01)
*G06F 9/52* (2006.01)
*G06F 9/30* (2018.01)
*G06F 9/48* (2006.01)
*G06F 15/80* (2006.01)
*G06T 1/20* (2006.01)

(52) U.S. Cl.
CPC ........... *G06F 9/52* (2013.01); *G06F 9/30032* (2013.01); *G06F 9/30036* (2013.01); *G06F 9/3828* (2013.01); *G06F 9/3851* (2013.01); *G06F 9/3887* (2013.01); *G06F 9/4881* (2013.01); *G06F 15/8053* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 8,510,534 B2* | 8/2013 | Van Berkel | ........... | G06F 9/3853 |
| | | | | 712/3 |
| 9,851,977 B2* | 12/2017 | Brunie | ................ | G06F 9/3887 |
| 10,599,534 B1* | 3/2020 | Jaggi | .................. | G06F 13/1663 |
| 10,649,770 B2* | 5/2020 | Johnson | ................ | G06F 16/23 |
| 2007/0279411 A1* | 12/2007 | Bakalash | ................ | G06T 1/20 |
| | | | | 345/419 |
| 2010/0329267 A1* | 12/2010 | Sakamoto | ................ | G06T 1/20 |
| | | | | 370/400 |
| 2012/0011349 A1* | 1/2012 | Khailany | ............. | G06F 9/3891 |
| | | | | 712/225 |
| 2014/0164737 A1* | 6/2014 | Collange | .............. | G06F 9/3851 |
| | | | | 712/205 |

(Continued)

FOREIGN PATENT DOCUMENTS

WO WO-2016091164 A1 * 6/2016 ........... G06F 15/167

*Primary Examiner* — Abu Zar Ghaffari
(74) *Attorney, Agent, or Firm* — Vierra Magen Marcus LLP

(57) ABSTRACT

A data processing system including a data processor which is operable to execute programs to perform data processing operations and in which execution threads executing a program to perform data processing operations may be grouped together into thread groups. The data processor comprises a cross-lane permutation circuit which is operable to perform processing for cross-lane instructions which require data to be permuted (copied or moved) between the threads of a thread group. The cross-lane permutation circuit has plural data lanes between which data may be permuted (moved or copied). The number of data lanes is fewer than the number of threads in a thread group.

20 Claims, 10 Drawing Sheets

(56) References Cited

U.S. PATENT DOCUMENTS

| | | | |
|---|---|---|---|
| 2014/0181477 A1* | 6/2014 | Vaidya | G06F 9/30018 |
| | | | 712/208 |
| 2015/0331720 A1* | 11/2015 | Huetter | G06F 9/5016 |
| | | | 718/104 |
| 2015/0372882 A1* | 12/2015 | Qian | H04L 41/5054 |
| | | | 709/219 |
| 2017/0249153 A1* | 8/2017 | Meixner | G06F 9/3836 |
| 2017/0286109 A1* | 10/2017 | Jha | G06F 9/30018 |
| 2018/0018299 A1* | 1/2018 | Han | G06F 9/3887 |
| 2018/0307487 A1* | 10/2018 | Maiyuran | G06F 9/30076 |
| 2019/0004814 A1* | 1/2019 | Chen | G06F 9/30003 |
| 2019/0042269 A1* | 2/2019 | Pearce | G06F 9/4843 |
| 2019/0066355 A1* | 2/2019 | Schluessler | G06T 15/005 |
| 2019/0073337 A1* | 3/2019 | Xu | G06F 9/3891 |
| 2019/0095208 A1* | 3/2019 | Nye | G06F 9/3891 |
| 2020/0162367 A1* | 5/2020 | Jiang | H04L 45/20 |

\* cited by examiner

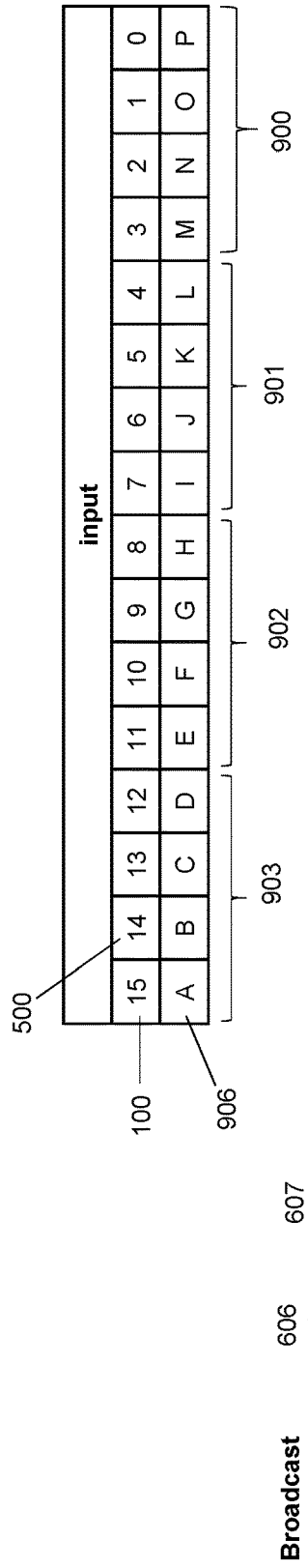

FIG. 9D

Shift Amount: 7

| lanes | feeding logic | | | | permutation logic | | | | result | | | | | | | | | | | | | | | |
|---|---|---|---|---|---|---|---|---|---|---|---|---|---|---|---|---|---|---|---|---|---|---|---|---|
| | 3 | 2 | 1 | 0 | 3 | 2 | 1 | 0 | 15 | 14 | 13 | 12 | 11 | 10 | 9 | 8 | 7 | 6 | 5 | 4 | 3 | 2 | 1 | 0 |
| pass 1 | A | E | I | M | M | A | E | I | | | | X | | | | A | | | | E | | | I | |
| pass 2 | D | H | L | P | P | L | H | D | | | X | X | | | X | A | | | D | E | | | H | I |
| pass 3 | C | G | K | O | K | O | C | G | | X | X | X | X | X | X | A | | C | D | E | | G | H | I |
| pass 4 | B | F | J | N | N | J | B | F | X | X | X | X | X | X | X | A | B | C | D | E | F | G | H | I |

FIG. 9E

XOR Amount: 5

| lanes | feeding logic | | | | permutation logic | | | | result | | | | | | | | | | | | | | | |
|---|---|---|---|---|---|---|---|---|---|---|---|---|---|---|---|---|---|---|---|---|---|---|---|---|
| | 3 | 2 | 1 | 0 | 3 | 2 | 1 | 0 | 15 | 14 | 13 | 12 | 11 | 10 | 9 | 8 | 7 | 6 | 5 | 4 | 3 | 2 | 1 | 0 |
| pass 1 | C | G | K | O | G | C | O | K | | | | G | | | D | C | | | P | O | | | L | K |
| pass 2 | D | H | L | P | H | D | P | L | | E | H | G | | A | D | C | | M | P | O | | I | L | K |
| pass 3 | A | E | I | M | E | A | M | I | | E | H | G | B | A | D | C | N | M | P | O | J | I | L | K |
| pass 4 | B | F | J | N | F | B | N | J | F | E | H | G | B | A | D | C | N | M | P | O | J | I | L | K |

EXECUTION OF CROSS-LANE OPERATIONS IN DATA PROCESSING SYSTEMS

BACKGROUND

The technology described herein relates generally to the operation of data processing systems which are operable to execute programs to perform data processing operations and in which execution threads executing a program to perform data processing operations are grouped together into thread groups in which the plural threads of a thread group can each execute a set of instructions in lockstep. In particular, the technology described herein relates to the provision of data from one or more threads of a thread group to one or more other threads of the thread group, e.g. during "cross-lane" operations such as broadcast, rotation, and shift operations.

Execution efficiency in data processing systems that execute programs to perform data processing operations may be improved by grouping execution threads (where each thread corresponds to one work "item") into "groups" or "bundles" of threads, where the threads of one group are run in lockstep, e.g. one instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.

An example of such a data processing system and data processor are graphics processing systems that include a graphics processor. However, other processing systems and processors can also be operable to execute programs using execution threads which are grouped into thread groups.

In such systems, each thread may execute across appropriate functional units (circuits), such as e.g. arithmetic units of a graphics processor. Typically, there will be a plurality of functional units provided in a processor (e.g. GPU), each of which can be respectively and appropriately activated and used for an execution thread when executing a program for data processing.

In a system where execution threads can be grouped into thread groups, the functional units (circuits) of the processor (e.g. a shader core of a GPU) for performing the processing operations in response to the instructions in a (e.g. shader) program are normally correspondingly operable so as to facilitate such thread group arrangements. For example, the functional units may be arranged as respective execution lanes, one for each thread that a thread group may contain, so that the processor (shader core) can execute the same instruction in parallel for each thread of a thread group.

In a data processing system wherein plural execution threads are grouped into thread groups, there may be situations where "cross-lane" operations need to be performed to permute (e.g. copy or transfer) data between threads of a thread group, before other subsequent operations can be performed. In this case, the set of instructions to be performed may include a "cross-lane" instruction which causes a "cross-lane" operation to be performed.

"Cross-lane" operations are operations operable to provide a data value(s) from one or more threads of a thread group to one or more (other) threads of that thread group, e.g. such that at least one thread of the thread group receives a data value from a different thread.

The Applicants believe that there remains scope for improvements to data processing systems operable to execute programs by execution threads grouped together into thread groups, and improvements in particular to the providing of data from one or more threads in a thread group to one or more other threads of the thread group (for performing "cross-lane" operations).

BRIEF DESCRIPTION OF THE DRAWINGS

A number of embodiments of the technology described herein will now be described by way of example only and with reference to the accompanying drawings, in which:

FIG. 9A shows an example thread group with associated thread data; and

FIGS. 9B-9E show example cross-lane operations that can be performed by the cross-lane permutation circuit and the result that is generated for each operation.

Like reference numerals are used for like components where appropriate in the drawings.

DETAILED DESCRIPTION

Figure 1:
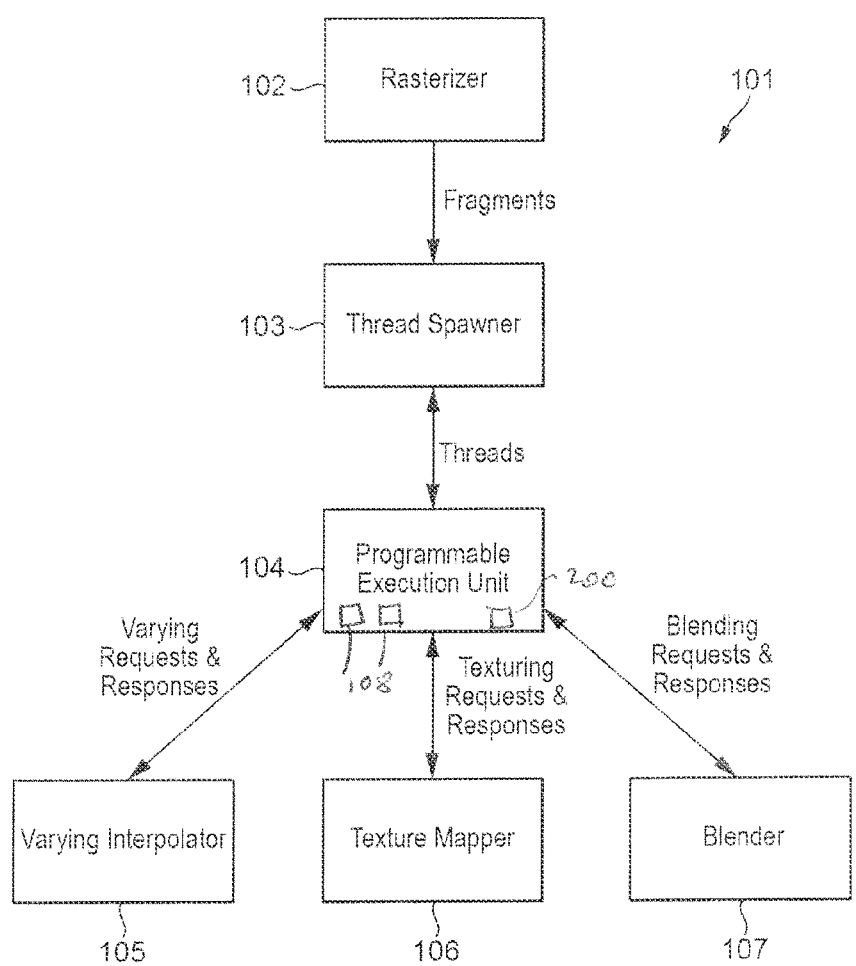
FIG. 1 shows schematically an embodiment of a graphics processing unit in which the technology described herein may be implemented.

A first embodiment of the technology described herein comprises a method of operating a data processing system, the data processing system including:

a data processor operable to execute programs to perform data processing operations and in which execution threads executing a program to perform data processing operations may be grouped together into thread groups in which the plural threads of a thread group can each execute a set of instructions in lockstep;

the data processor comprising:

an instruction execution processing circuit operable to execute instructions to perform processing operations for execution threads executing a program, the execution processing circuit being configured as a plurality of execution lanes, each execution lane being operable to perform processing operations for a respective execution thread of a thread group;

and a cross-lane permutation circuit, the cross-lane permutation circuit comprising a plurality of data lanes, each data lane having an input and an output, the cross-lane permutation circuit having fewer data lanes than the number of execution lanes of the instruction execution processing circuit, and being configurable to, for each data lane, provide a data value input to that data lane to zero or more of the other data lanes, such that the provided data value will be output by the zero or more other data lanes;

the method comprising, when executing an instruction for the threads of a thread group using the execution processing circuit, to provide a data value or values from a thread or threads of a thread group to another thread or threads of the thread group, performing one or more permutation processing passes using the cross-lane permutation circuit, each permutation processing pass using the cross-lane permutation processing circuit comprising:

for each data lane of the cross-lane permutation circuit, providing as input data to the data lane, data from a single execution thread of a sub-set of the execution threads of the thread group that is associated with the data lane;

the cross-lane permutation circuit performing a permutation operation using data provided to the data lanes, to provide as an output for at least one of the data lanes, a data value input to a different one of the data lanes; and the cross-lane permutation circuit, after performing the permutation operation, for at least one of the data lanes, providing the data output from the data lane for use by one of the execution threads of the sub-set of execution threads associated with that data lane.

Another embodiment of the technology described herein comprises a data processing system, the data processing system operable to execute programs to perform data processing operations, the data processing system including:

a data processor operable to execute programs to perform data processing operations and in which execution threads executing a program to perform data processing operations may be grouped together into thread groups in which the plural threads of a thread group can each execute a set of instructions in lockstep;

the data processor comprising:

an instruction execution processing circuit operable to execute instructions to perform processing operations for execution threads executing a program, the execution processing circuit being configured as a plurality of execution lanes, each execution lane being operable to perform processing operations for a respective execution thread of a thread group;

and a cross-lane permutation circuit, the cross-lane permutation circuit comprising a plurality of data lanes, each data lane having an input and an output, the cross-lane permutation circuit having fewer data lanes than the number of execution lanes of the instruction execution processing circuit, and being configurable to, for each data lane, provide a data value input to that data lane to zero or more of the other data lanes, such that the provided data value will be output by zero or more of the other data lanes;

wherein the data processor is operable to use the cross-lane permutation circuit to perform one or more permutation processing passes to provide a data value or values from a thread or threads of a thread group to zero or more other threads of the thread group when executing an instruction for the threads of a thread group;

wherein the data processor is operable to, for each of the permutation processing passes, provide as input data to each data lane of the cross-lane permutation circuit, data from a single execution thread of a sub-set of the execution threads of the thread group that is associated with the data lane;

wherein the permutation processing circuit is operable to, for each of the permutation processing passes, perform a permutation operation using the data provided to the data lanes, to provide as an output for zero or more of the data lanes, a data value input to a different one of the data lanes; and wherein the cross-lane permutation circuit is operable to, after performing the permutation operation, for at least one of the data lanes, provide the data output from the data lane for use by one of the execution threads of the sub-set of execution threads associated with that data lane.

As will be discussed further below, the technology described herein comprises a method of operating a data processing system and a data processing system which allow data to be provided to a thread or threads in a thread group from another (different) thread or thread(s) of the thread group. This provision (permutation) of data (between threads of the thread group) is facilitated by using a cross-lane permutation circuit.

In this regard, the Applicants have recognised that whilst transfer of data between threads could be performed through writing out data to an external memory of the system, and then each thread reading back in the data which it requires, this is likely to be a slow process. In comparison, the technology described herein comprises a cross-lane permutation circuit which is operable to permute (e.g. copy or transfer) data between threads of a thread group.

The data processing system (or data processor) may comprise any system (or processor) operable to execute programs for processing data. For example, the data processing system may be a graphics processing system. The data processor may comprise a graphics processor The program(s) which are executed by the data processor may comprise any suitable and desired program(s). For example, in the case of a graphics processor, a program may be, and is in an embodiment, a (graphics) shader program. The program may be, for example, a geometry shader program (a program for executing geometry shading operations), a vertex shader program (a program for executing vertex shading operations), or a fragment shader program (a program for executing fragment shading operations).

The program will comprise a sequence of instructions to be executed by the executions threads. The set (sequence) of instructions being executed for the program can be any desired and suitable instructions that would typically be executed by plural threads. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions).

Instructions (e.g. such as for cross-lane operations, or any other processes to be performed by the data processing system) for the execution lanes may be provided to the data processor by a compiler (as compiled code). In these arrangements, the compiler (the compiler processing circuit) in an embodiment is part of and executes on a central processing unit (CPU), such as a host processor, of the data processing system, and in an embodiment is part of a driver for the data processor that is executing on the CPU (e.g. host processor). In this case, the compiler and compiled code would run on separate processors within the overall data processing system. However, other arrangements would be possible, such as the compiler running on the same processor as the compiled code, or the compiler being run on a (completely) separate processor such as the program being pre-compiled on a separate system and being distributed in a compiled form.

The compilation process (the compiler) can generate the sequence of instructions of the technology described herein in any suitable and desired manner, e.g., and in an embodiment, using any suitable and desired compiler techniques for that purpose.

The processor comprises an instruction execution processing circuit operable to execute instructions (e.g. received from a compiler) to perform processing operations, the processing operations being performed by executing threads which are grouped together into thread groups.

The execution threads and thread groups for execution by the instruction execution processing circuit may be generated and issued to the instruction execution processing circuit in any suitable and desired manner. This may depend, for example, upon what work "items" the threads and thread groups represent. For example, there may be a thread generation circuit (stage) that, generates the threads and thread groups. There may then, e.g., and in an embodiment, be an appropriate thread group scheduler that issues thread groups to the instruction execution processing circuit for execution. Other arrangements would, of course, be possible.

Each execution thread and/or thread group can relate to any suitable and/or desired work "item" that the program in question is to be executed for. For example, in the case of a graphics processor, each thread may correspond to a vertex or a sampling position, with the thread groups corresponding to appropriate sets of plural vertices or sampling positions. For example, each thread group ("warp") may correspond to one or more graphics fragments, with each thread in the thread group then corresponding to a respective sampling position that the fragment(s) represent.

The thread groups (the groups of plural threads) that the execution threads executing the program (and the sequence of instructions) are grouped into can be any suitable and desired size. The thread groups are in an embodiment all the same size (at least for a given instance of a program execution). In an embodiment, there is a fixed thread group size that the data processor supports. The thread groups may contain, e.g. 4, 8, 16 or 32 threads (i.e. there is a "warp width" of 4, 8, 16 or 32). In an embodiment there are 16 threads in a thread group. Wider thread groups (warps) would be possible, if desired.

The instruction execution processing circuit may be operable and arranged as any desired (plural) number of execution lanes. In an embodiment, there are as many execution lanes as the (maximum) number of threads that may be included in a thread group (although other arrangements would be possible, if desired). Thus, in an embodiment, each thread group comprises a particular number of threads, and the execution processing circuit comprises (in an embodiment exactly) that particular number of execution lanes. Thus in the case where each thread group contains 16 threads, in an embodiment there are 16 execution lanes.

Each execution lane is operable to perform processing operations for a respective execution thread of a thread group. Each execution lane is in an embodiment provided by one or more functional units operable to perform data processing operations for an instruction being executed by an execution thread.

Correspondingly, each functional unit should be, and in an embodiment is, able to process as many threads in parallel as there are execution lanes (each functional unit will comprise a set of plural execution lanes).

Each execution lane could comprise overall only a single functional unit, or could comprise plural functional units. Each execution lane should, and in an embodiment does, comprise overall the same functional unit or units as the other execution lanes (so that each execution lane can operate in the same manner in respect of a thread). Where each execution lane comprises plural functional units overall, then the execution threads could be issued to the functional units effectively as a whole (as a single set of plural functional units) or different (e.g. each) functional units making up the overall execution lane could be treated independently, such that the individual functional units could, e.g., have their own thread group issuing circuit, with execution threads being issued to the functional units independently of other functional units.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load type units, store type units, etc. In an embodiment, the functional units (at least) comprise arithmetic units (i.e. units operable to perform arithmetic (mathematical) operations).

The instruction execution processing circuit, execution lanes, and functional units can be implemented as desired and in any suitable manner. They will comprise (be implemented as) suitable hardware elements such as processing circuits (logic).

The instruction execution processing circuit of the data processor in an embodiment also comprises an appropriate control circuit (control logic) for controlling (the execution lanes of) the functional units to cause them to perform the desired and appropriate processing operations. The control circuit may also be configured to control the operation of the cross-lane permutation circuit (as discussed herein). The control circuit may comprise any suitable and desired control circuit.

In an embodiment, the control circuit comprises instruction fetch circuit and instruction decode circuit. The instruction fetch circuit may be operable to fetch instructions to be executed by (the threads of) the data processor. The instruction decode circuit may be operable to decode an instruction which has been fetched by the fetch circuit and which is to be executed by the processor, such that the execution processing circuit (or cross-lane permutation circuit for the case of cross-lane instructions) of the data processor may execute the instruction. The control circuit may also be operable to fetch any operands required for executing an instruction.

In an embodiment, each execution lane of the instruction execution processing circuit has associated with it (and available to it), a set of one or more, and in an embodiment a set of plural, registers for storing data values associated with and for the execution lane (i.e. for storing data values being processed for the execution thread that the execution lane is currently executing). This can facilitate, for example, the handling of execution threads and their data values in an execution lane without the need, e.g., and in an embodiment, to (always) require access to memory (to the memory system of the data processing system). The registers for the execution lanes can be arranged in register file banks, as desired, and as appropriate.

The technology described herein relates in particular to the execution of cross-lane instructions using a cross-lane permutation circuit to perform cross-lane operations.

A "cross-lane" instruction as used herein is an instruction which, when executed, causes a "cross-lane" operation to be performed. A cross-lane operation is operable to permute (copy or transfer (move)) data between the threads of a thread group, e.g. such that data from one thread of the thread group is copied or transferred (moved) to at least one different thread of the thread group. Hence, a cross-lane operation is an operation which is operable to cause at least one thread in a thread group to receive data from (or corresponding to) a different thread of the thread group.

Such operations could comprise copying data from one thread to one or more, and in an embodiment plural, threads of the thread group, or transferring (moving) data from one thread to another thread (within the thread group).

Some example "cross-lane" operations are broadcast operations (where a value from one thread is copied to plural (and in an embodiment all) other threads of the thread group), "rotation" operations (where a data value from each thread is transferred across the thread group by a specified number of threads, wherein the thread group is treated as a closed loop so that any value transferred beyond the end of the thread group will wrap around to the start of the thread group), "shift" operations (which are similar to "rotation" operations except that the thread group is not treated as a closed loop, such that any values that are shifted beyond the end (of the width) of the thread group are not provided to any of the threads, and a thread to which a value is not transferred will be provided with a pre-determined (e.g. null) value), and "XOR" operations (where the destination thread for data transferred from particular starting thread is determined based on an XOR calculation using an identifier for the starting thread). The particular number of threads over which values should be "rotated" or "shifted" (e.g.), may be, e.g., indicated by the cross-lane instruction itself or by an operand for the cross-lane instruction. Other "cross-lane" operations also exist, and could be performed using the cross-lane permutation circuit of the technology described herein.

In an embodiment, a "cross-lane" operation (to be performed using the cross-lane permutation circuit of the technology described herein) comprises at least one of: copying data from a thread to one or more, and in an embodiment plural, other threads of the thread group (e.g. such as a broadcast operation); and transferring data from a (single) thread to another (single) different thread of the thread group (e.g. such as for rotation, shift and XOR operations).

When a "cross-lane" operation comprises copying data from a thread to one or more other threads of the thread group, the thread (from which data is copied) in an embodiment retains its (original) data (e.g. such as in a broadcast operation), or is provided with data which is not related to any of the other threads (e.g. such as a predetermined, e.g. null, value).

When a "cross-lane" operation comprises transferring data from a (single) thread to another (single) different thread of the thread group, the thread from which data is transferred is in an embodiment provided with a data value from another thread (such as in a rotation operation), or provided with data which is not related to any of the other threads (such as a predetermined, e.g. null, value) (as may occur for some threads in a shift operation).

In other words, a cross-lane operation in an embodiment comprises at least one of: providing data from a (single) thread to a (in an embodiment different) (single) thread (e.g. such as in a rotate, shift or XOR operation); and providing data from a (single) thread to a multiple threads, in an embodiment including that (single) thread (e.g. such as a broadcast operation).

Thus, in a cross-lane operation, while at least one thread of the thread group may receive data from a different thread, some of the threads of the thread group may not receive data from a different thread (such that they retain (are provided with) data corresponding to their original thread data from prior to the cross-lane operation), and/or some of the threads may be provided with a pre-determined value or other value which is not related to or derived from data in a particular (or any) thread of the thread group, e.g. some of the threads may be provided with a null value (this may occur for a shift operation, for example).

Also, whilst cross-lane instructions are intended to copy and/or move data between threads of a thread group, the Applicants have recognised that situations can arise where when executing a cross-lane instruction, no data should in fact be moved or copied, e.g. depending on the value of an operand associated with the cross-lane instruction.

For example, a "rotation", "shift" or "XOR" cross-lane instruction may have a "rotation", "shift" or "XOR" amount of zero, e.g. where an operand which indicates a rotation, shift or XOR amount is zero. (This could arise, for example, where the rotation, shift or XOR amount is, or is dependent on, a variable whose value can in practice be zero, such as a variable whose value is only set at runtime and so cannot be known in advance of executing the program)). In the case of a rotation or shift operation having a rotate or shift amount of zero, for example, the execution of the cross-lane instruction should not rotate or shift the data at all (i.e. should result in no data being moved or copied when executing the cross-lane instruction).

Another example where, in fact, no data is to be moved or copied when executing a cross-lane instruction is if a cross-lane instruction requires each thread to be provided with a pre-determined (e.g. null) value. This can arise, for example, if a "shift" instruction requires a shift amount which is larger than the number of threads in the thread group, e.g. based on an operand which indicates such a shift amount.

As will be discussed below, the cross-lane permutation circuit and operation of the technology described herein should, and in an embodiment does, support, and is configurable to perform, such cross-lane operations where no data is actually to be moved or copied for a cross-lane instruction (such that when executing the cross-lane instruction, the cross lane permutation circuit will provide each thread with data which corresponds to the data that was originally associated with that thread prior to executing the cross-lane instruction), and/or where each thread is to be provided with a predetermined (e.g. null) value data (such that the cross-lane permutation circuit will provide each thread with the pre-determined (e.g. null) value data, as required).

The data processor may be, and in an embodiment is operable to identify cross-lane instructions (e.g. such as "broadcast", "rotate", "shift" and "XOR" instructions), and to execute all such cross-lane instructions using the cross-lane permutation circuit (configured in the appropriate manner), regardless of whether or not any data will actually be moved or copied between the threads during execution of the cross-lane instruction (e.g. prior to identifying the values of any operands associated with the cross-lane instruction).

Alternatively, the data processor may be operable to determine whether a cross-lane instruction will require or result in any data being moved or copied between the threads of a thread group, and to execute a cross-lane instruction without using the cross-lane permutation circuit (e.g. using another functional unit of the data processor) if it is determined that no data should in fact be moved or copied between the threads of a thread group.

The result of a cross-lane operation performed when executing a cross-lane instruction (i.e. the data which is associated with each respective thread of the thread group after the data has been permuted during the cross-lane operation) can then be used when executing other, subsequent, instructions in an instruction stream.

In the technology described herein, when executing a "cross-lane" instruction, the cross-lane instruction is processed using the cross-lane permutation circuit of the data processor.

The cross-lane permutation circuit comprises a plurality of data lanes between which data can be permuted (copied or transferred). Each data lane has an input and an output. When executing a cross-lane instruction to perform a cross-lane operation, the cross-lane permutation circuit is operable to receive as an input for each of the data lanes data from (or corresponding to) a thread of the group of threads, perform a permutation operation to permute (e.g. copy or transfer) input data between the data lanes to provide output data for each of the data lanes, and provide the output data from the data lanes for use by appropriate threads of the thread group, such that the result of executing the cross-lane instruction by the cross-lane permutation circuit is that data is permuted (e.g. copied or transferred) between threads of the thread group.

Whilst it would be possible for the cross-lane permutation circuit to have as many data lanes as there are execution lanes to support a full thread group width in parallel, the Applicants have recognised that such a cross-lane permutation circuit which operates across the entire width of a thread group would be costly and have a large hardware requirement. For example, if a thread group contained 16 threads, the permutation circuit would then have 16 data lanes, and would need to be able to move data between any and all of these 16 data lanes.

In this regard, the Applicants have recognised that it is possible to use a narrower cross-lane permutation circuit to copy or transfer data from one or more threads to one or more other threads of a thread group when performing a cross-lane operation for a thread group, thereby reducing the hardware requirements compared to a cross-lane permutation circuit that operates across the entire width of a thread group.

Hence, in the technology described herein, the cross-lane permutation circuit has fewer data lanes than the number of execution lanes of the execution circuit (than the number of threads in a thread group).

As mentioned above, each data lane of the cross-lane permutation circuit has an input and an output.

When executing a cross-lane instruction, the cross-lane permutation unit is operable to perform one or more permutation processing passes, each processing pass comprising performing a permutation operation using data provided as input data to the data lanes in order to provide output data for the data lanes, wherein the permutation operation comprises permuting (e.g. copying or transferring) the input data between the data lanes, For each permutation pass, each data lane is operable to receive as an input data from (corresponding to) a (single) thread of a thread group and to output data for use by a (single) thread of the thread group.

Since there are fewer data lanes in the cross-lane permutation circuit than the number of threads in a thread group of the data processor, and since the output of a data lane is only provided for use by a single thread of the thread group, it is apparent that a single pass performed using the cross-lane permutation circuit will not generate an output for all of the threads of the thread group. In particular, for a given pass, the number of threads for which an output value is generated equals the number of data lanes of the cross-lane permutation circuit.

Hence, when executing a cross-lane instruction to perform a cross-lane operation, the cross-lane permutation circuit of the technology described herein may need to, and in an embodiment does, perform multiple permutation passes in order to provide the appropriate data to all of the threads of the thread group.

The number of passes (to be) performed by the cross-lane permutation circuit should, and in an embodiment does, depend on the number of threads in a thread group, and also on the number of data lanes in the cross-lane permutation circuit. In particular, since in each pass, the number of output data values provided for use by the threads equals the number of data lanes of the cross-lane permutation circuit, then the number of passes required will be equal to the number of threads divided by the number of data lanes in the cross-lane permutation circuit. For example, if there are 16 threads in a thread group, and the cross-lane permutation circuit has 4 data lanes, then the cross-lane permutation circuit will need to perform 4 passes in order to provide output data values for all of the threads in the group.

Although the cross-lane permutation circuit of the technology described herein may need to perform multiple permutation passes when performing cross-lane operations, the Applicants have recognised that any resulting increase in processing time is outweighed by the hardware (area) saving of the "narrower" cross-lane permutation circuit of the technology described herein, compared to a "full-width" cross-lane permutation circuit. This is particularly the case because, as recognised by the Applicant, cross-lane operations are generally not performed particularly often (in graphics processing systems for example).

The Applicants have further recognised that is it not necessary for each of the lanes of the narrower cross-lane permutation circuit to be able to receive data from all of the threads of the thread group. In this regard, the Applicants have recognised that many types of cross-lane operation can be performed if each data lane is only operable to receive data from an associated sub-set of the threads of the group and operable to output data to that same associated sub-set of threads, provided that the combined sub-sets for all of the data lanes span the entire width of the thread group (such that each thread of the thread group is contained within one of the sub-sets). This then allows, for any given permutation pass, required data from any thread to be copied or transferred to any other thread, since the required data can be provided as input data for the data lane associated with the sub-set that the thread in question belongs to, and permuted (copied or moved) to the data lane(s) associated with the sub-set(s) that thread(s) to which the data should be output belong.

Hence, the cross-lane permutation circuit of the technology described herein is configured to treat a thread group as though it is comprised of (divided into) plural sub-sets of threads. Furthermore, the cross-lane permutation circuit is configured to provide to a particular data lane data only from threads which belong to the sub-set of threads that is associated with that data lane, and to output data from a particular data lane only to threads which are associated with that data lane.

Hence, the cross-lane permutation circuit is configured to, when performing a permutation processing pass: for each data lane of the cross-lane permutation circuit, provide as input data to the data lane, data from a single execution thread of a sub-set of the execution threads of the thread group that is associated with the data lane; perform a permutation operation using data provided to the data lanes, to provide as an output for zero or more of the data lanes, a data value input to a different one of the data lanes; and, after performing the permutation operation, for at least one of the data lanes, provide the data output from the data lane for use by one of the execution threads of the sub-set of execution threads associated with that data lane.

Thus, in the technology described herein, thread groups are each divided into plural sub-sets of execution threads, with each sub-set being associated with a respective data lane of the cross-lane permutation unit. In an embodiment, each data lane has the same number of threads associated with it (as the other data lanes), such that the threads are divided evenly among the data lanes (i.e. each sub-set of threads contains the same number of threads, with each thread being in one subset only, such that each of the threads of the thread group is associated with only one data lane). In an embodiment, each data lane is associated with a different sub-set of threads.

In an embodiment each data lane is associated with a sub-set of threads which are contiguous threads (threads which are adjacent in the thread group). For example, if the thread group is considered to be indexed in numerical order across the width of the thread group, then the sub-set of threads associated with a data lane may comprise threads having adjacent (successive) numerical indices.

For example, a data processor system may have 16 threads executing as part of a thread group ("warp"). In this case, the cross-lane permutation circuit may comprise 4 data lanes, with each data lane being associated with a different sub-set of threads, with each sub-set in an embodiment comprising 4 contiguous threads of the thread group.

In an embodiment, each data lane of the cross-lane permutation circuit is associated with a respective sub-set of the execution lanes of the instruction execution processing circuit of the data processor (and thereby with the sub-set of the threads that those execution lanes are executing). Thus, each data lane of the cross-lane permutation circuit is in an embodiment configured and operable to receive as an input data from the sub-set of execution lanes which the data lane is associated with.

Thus, in an embodiment, the execution lanes of the instruction execution processing circuit are configured as plural sub-sets of execution lanes with respect to the cross-lane permutation circuit, with each sub-set of execution lanes being associated with a respective data lane of the cross-lane permutation unit. In an embodiment, each data lane has the same number of execution lanes associated with it (as the other data lanes), such that the execution lanes are divided evenly among the data lanes (i.e. each sub-set of execution lanes contains the same number of execution lanes, with each execution lane being in one subset only, such that each of the execution lanes of the instruction execution processing circuit is associated with only one data lane). In an embodiment, each data lane is associated with a different sub-set of execution lanes.

In an embodiment each data lane is associated with a sub-set of execution lanes which are contiguous execution lanes (execution lanes which are adjacent in the instruction execution processing circuit). For example, if the execution lanes are considered to be indexed in numerical order across the width of the execution lanes, then the sub-set of execution lanes associated with a data lane may comprise execution lanes having adjacent numerical indices.

For example, a data processor system may have 16 execution lanes executing respective threads of a thread group ("warp"). In this case, the cross-lane permutation circuit may comprise 4 data lanes, each data lane associated with a different sub-set of 4 contiguous execution lanes.

When performing a cross-lane instruction using the cross-lane permutation unit of the technology described herein, input data for the data lanes may be received from a thread (execution lane) of the sub-group of threads (execution lanes) associated with the data lane in any suitable manner. For example, the input data may be received from a register associated with a thread of the sub-group of threads (execution lanes) associated with the data lane (e.g., by the cross-lane permutation circuit reading the data from said register). Alternatively, the input data may be provided to the cross-lane permutation circuit from an execution lane associated with the data lane (e.g. upon or following generation of the data by a functional unit that is part of the execution lane, or upon or following the cross-lane permutation circuit requesting that data from a functional unit of the execution lane).

Each lane of the cross-lane permutation circuit may be configured such that it is only able to receive (request) data corresponding to the threads (execution lanes) that it is associated with. The input data value for each of the data lanes may be stored in a register associated with the cross-lane permutation circuit. For example the input data value for each of the data lanes may be stored in a register (or a portion of a register) associated with that data lane.

The cross-lane permutation circuit of the technology described herein is operable to execute a cross-lane instruction by performing perform one or more, and in an embodiment multiple, permutation processing passes.

In each permutation processing pass, input data is received by the data lanes of the cross-lane permutation circuit from certain threads of the thread group, a permutation operation is then performed to permute (e.g. copy or transfer) the input data between the data lanes of the permutation unit, and the permuted input data is then provided as an output for use by certain threads of the thread group. As mentioned above, multiple permutation processing passes may be required in order to provide data for all of the threads of the thread group (and hence, to complete the processing for the cross-lane permutation instruction). Hence, the cross-lane permutation circuit in an embodiment performs multiple permutation processing passes when executing a cross-lane instruction.

The permutation operation which is performed for each pass will depend on the (cross-lane) instruction which is being executed by the cross-lane permutation circuit.

The permutation operations which the cross-lane permutation circuit can perform (supports) in an embodiment comprise at least one of (and in an embodiment all of): copying input data from a data lane to one or more, and in an embodiment to plural, other data lanes (e.g. when executing a broadcast cross-lane instruction); transferring input data from a (single) data lane to another (single) different data lane (e.g. when executing rotation, shift and XOR cross-lane instructions); and retaining input data in (only)

the data lane that it was provided to (e.g. such that input data for that lane is not copied or moved to any other data lanes (e.g. when executing rotation, shift or XOR instructions that in fact move no data between threads)).

When the permutation operation comprises copying data from a data lane to other data lanes of the cross-lane permutation circuit, the data lane (from which data is copied) in an embodiment retain its (original) input data (e.g. when executing a broadcast cross-lane instruction), or be provided with data which is not related to any of the other data lanes (e.g. such as a predetermined, e.g. null, value).

When a permutation operation comprises transferring data from a (single) data lane to another (single) different data lane of the cross-lane permutation circuit, the data lane (from which data is transferred) in an embodiment is either provided with a data value from another data lane (e.g. when executing a rotation or shift cross-lane operation), or is provided with data which is not related to any of the other data lanes (such as a predetermined, e.g. null, value) (e.g. when executing a shift cross-lane instruction).

In other words, a permutation operation may comprise at least one of: providing data from a (single) data lane to a (single) (and in an embodiment different, but possibly the same) data lane (e.g. when executing a rotate, shift or XOR cross-lane instruction); and providing data from a (single) data lane to a multiple data lanes, in an embodiment, including that (single) data lane (e.g. when executing a broadcast cross-lane instruction).

In a permutation operation, while at least one data lane may receive data from a different data lane, one or more or all of the data lanes may not receive data from a different data lane (e.g. such that they retain an originally input data value). In the latter case, the data which is input to the data lane may pass through the data lane to be output (unchanged) from that data lane. For example, when a cross-lane operation requires a thread to retain its original data value during a cross-lane operation (such that the thread is not provided with a value from another thread, and is not provided with a predetermined (e.g. null) value), then cross-lane permutation circuit may be configured to provide data from that thread as input data for a data lane associated with that thread, to pass the input data unchanged through the data lane, and to output the data from that data lane to the same thread (as the thread which provided the input data to the data lane).

As discussed above, such a situation may, for example, arise where a cross-lane instruction in fact does not require any data to be copied or moved among the threads, such that each of the threads retains its original data value (e.g. a "shift", "rotate" or "XOR" operation having a "shift amount", "rotation amount" or "XOR amount" of zero). In such a situation, when executing the cross-lane instruction, the cross-lane permutation unit may be configured such that each thread is provided with data which was originally associated with that thread, for example, and in an embodiment, by configuring the cross-lane permutation circuit such that each data lane in a permutation processing pass outputs to the same thread from which it received its input (and provides its input data value to no (to zero) other data lanes). Thus a, and in an embodiment each, data lane will be configured to provide a data value input to the data lane to zero (to none) of the other data lanes.

This may be done, e.g., for each permutation pass (for all the permutation processing passes) of a sequence (set) of permutation processing passes for a cross-lane instruction where the overall cross-lane operation will not copy or move any data between the threads, and/or for a respective pass or passes (but not necessarily all passes) of a sequence (set) of permutation processing passes for a cross-lane instruction that are not to copy or move data between threads.

Corresponding arrangements can be used where a cross-lane instruction in fact requires each thread to be provided with a pre-determined (e.g. null) value. (As discussed above, this can arise, e.g., if a "shift" instruction requires a shift amount which is larger than the number of threads in the thread group). In such a situation, when executing the cross-lane instruction, the cross-lane permutation unit may be configured such that, in a permutation processing pass, each thread is provided with the pre-determined (e.g. null) value. In this case, the cross-lane permutation circuit may be configured such that it does not move or copy any data between the data lanes during a permutation pass (such that each data lane provides its input data value to no (to zero) other data lanes).

This may again be done, e.g., for each permutation pass where the overall cross-lane operation will provide each thread with a pre-determined (e.g. null) value and/or for a respective pass or passes (but not necessarily all passes) that are to provide each output thread for that pass with a pre-determined (e.g. null) value.

The cross-lane permutation circuit should and in an embodiment does comprise a permutation circuit operable to and that performs the permutation operation itself. This permutation circuit may comprise any suitable and desired circuit that can perform the required permutation operation (s). For example, the permutation circuit may comprise an arrangement (e.g. network) of multiplexers, e.g., comprising four 4-to-1 multiplexers that can be configured in use to receive input data values from the data lanes and to move data values between the data lanes of the cross-lane permutation circuit. Hence, the permutation circuit is operable to and configurable to permute (copy or transfer) data between the data lanes of the cross-lane permutation circuit.

Although it is mentioned above that predetermined, e.g. null, values may be provided to data lanes during the permutation operation, in an embodiment data lanes are (only) provided with data from another data lane (such that none of the data lanes are provided with predetermined, e.g. null, values during the permutation operation). Then, if a predetermined, e.g. null, value is required to be output for a particular thread, this is done independently of the permutation operation (such that the thread is provided with a predetermined, e.g. null, value regardless of the output data value for the data lane which is associated with the thread).

In this case, the output value for the data lane may comprise a value corresponding to an input value of any of the data lanes, but the value which is (ultimately) provided to thread is a (predetermined) value (e.g. a null value). Hence, in an embodiment, the cross-lane permutation circuit is operable to, if it is determined that the cross-lane instruction being executed requires a thread to be provided with an output data value which is a predetermined (e.g. null) value, to provide this predetermined (e.g. null) value to the thread in question regardless of the output of the data lane which is associated with that thread.

In the case where a "null" or default value is to be provided to a thread or threads, that value can be defined and indicated in any suitable and desired manner, for example by being predefined for the output, program and/or system in question. In an embodiment the "null" value can vary, e.g. between different cross-lane instructions. In an embodiment, the null value to use is indicated (set) by the cross lane instruction itself.

The cross-lane permutation circuit is operable to, after performing the permutation operation for a permutation processing pass, provide the data output from at least one of the data lanes for use by a (single) thread (execution lane) of the sub-set of threads (execution lanes) associated with that data lane. The output data from the data lane, can then be made available to the thread (execution lane) in question for use when performing subsequent processing (e.g. when executing subsequent instructions of a program).

The output data from the data lane may be made available to the thread (execution lane) in question (e.g. immediately) after the associated permutation processing pass (which provides the output data for the thread in question) has been performed. Alternatively, the output data may not be made available until all of the processing passes for the cross-lane instruction have been performed (such that the data for each of the threads is only made available once the output data for all of the threads has been provided by the cross-lane permutation circuit).

The output value for a data lane may be provided to a thread (execution lane) in any suitable and desired manner. For example, the output value may be written to a register or may be broadcast by the cross-lane permutation circuit for use by the thread (execution lane) in question.

For example, for each pass, the output value from each data lane may (initially) be written to a register that is associated with (only) that data lane. Then, (e.g. once all of the permutation processing passes for a cross-lane operation have been performed) data from each register associated with a data lane may be made accessible to the relevant thread, such that each thread can access the required output data.

As discussed in the above, the cross-lane permutation circuit of the technology described herein may perform plural permutation processing passes in order to execute a cross-lane instruction, wherein each pass will output data for some but not all of the threads (since in each pass, the number of threads for which data is provided equals the number of data lanes in the cross-lane permutation circuit). As referred to in the following, a "set of passes" (or equivalently a "set of permutation processing passes") consists of the plural permutation processing passes which are performed by the cross-lane permutation circuit in order to execute a single cross-lane instruction.

In an embodiment, when executing a cross-lane instruction, each pass performed by the cross-lane permutation circuit provides output data for different threads of the thread group (compared to the other passes of the set of passes). Hence, for each pass, a data lane will provide an output data value for use by a different thread of its associated sub-set of threads (compared to the other passes of the set). This ensures that data is provided for all of the threads of the thread group with the minimum possible number of passes. In an embodiment, the number of passes equals the number of threads within the sub-set of threads associated with each data lane.

It would be possible for there to be a dynamic selection and setting of which thread of a thread subset receives the corresponding data lane output in a given pass (and for the data lanes, e.g., to each provide output data to different respective threads of their sub-sets of threads in a given pass, if desired).

However, in an embodiment, for any given pass, for each data lane, the output data value from the data lane is output to the same thread of (the thread having the same position within) the sub-set of threads that is associated with the data lane. (Thus, for example, all the data lanes will output their output value to the first thread of their respective thread sub-set in a pass). (The input data value for the data lane, however, can in an embodiment be obtained from any of the threads of the sub-set of threads associated with that data lane (so as to ensure that the input data comprises the data which is to be provided as output data for the threads in a particular pass).)

Hence, in an embodiment, for a pass in a set of permutation processing passes, the cross-lane permutation circuit will output data to the same thread (the same thread "position") (to the same execution lane (position)) in each of the sub-set of threads.

In an embodiment, for each pass, the output data of each data lane data is provided to a different (single) thread of the sub-set of threads associated with the data lane (compared to other passes in the set of passes for executing a cross-lane instruction).

In an embodiment, the data is provided to the threads associated with a data lane in a fixed (and in an embodiment predetermined) order over the sequence (set) of permutation passes (such that there is a fixed (and in an embodiment predetermined) mapping (sequence) for the provision of outputs from each data lane for use by the threads associated with the data lanes over a sequence (set) of permutation passes). This "output" order is in an embodiment independent of the particular cross-lane operation which is to be performed.

For example, in a first pass, each data lane may provide an output data value for use by a first (e.g. the lowest) thread of the sub-set of threads associated with the data lane, in a second pass, each data lane may provide an output data value for use by a second, different (e.g. higher) thread of the sub-set of threads associated with the data lane, and so on.

Hence, in an embodiment, the order in which the output data values are provided for the threads of the sub-set of threads associated with a data lane is a predetermined order (e.g. from the lowest thread to the highest thread, or progressing successively across the width of the sub-set of threads for successive passes). In an embodiment, the thread of the sub-set of threads to which the output data is provided is incremented with each pass (until output data has been provided for each of the threads).

A control signal for the providing (e.g. writing out) of the output data may be modified between passes to ensure that each output data value is provided to the correct thread for that pass.

Outputting the data to the same thread of each sub-set of threads for each pass, and in a predetermined order among the passes, allows the control logic and processing needed to provide the outputs to the relevant threads to be simplified. For example, the same control signal may be provided to each data lane for providing (e.g. writing out) output data for use by the same thread of the sub-set of threads associated with each data lane. This facilitates simpler control logic and architecture within the cross-lane permutation circuit.

As mentioned above, in each permutation processing pass, input data is received by the data lanes of the cross-lane permutation circuit from certain threads of the thread group, and a permutation operation is then performed to permute (e.g. copy or transfer) the input data between the data lanes of the cross-lane permutation unit (which is output to the threads as discussed above).

In an embodiment, for any given pass, for each data lane, data is input to the data lane from the same thread of (the thread having the same position within) the sub-set of threads that is associated with the data lane. (Thus, for example, all the data lanes will receive an input value from the first thread of their respective thread sub-set in a pass). Alternatively, for each data lane, data could be input to the data lane from any thread associated with the data lane (e.g. such that data may be input to each data lane from a different thread of the sub-set of threads associated with the data lane).

Hence, in an embodiment, for a pass in a set of permutation processing passes, the cross-lane permutation circuit provides to each data lane input data from the same thread (the same thread "position") (the same execution lane (position)) of each sub-set of threads.

Providing the input data from the same thread of each of the sub-sets of threads associated the data lanes in a pass allows the control logic and processing needed to provide the input data to the relevant data lanes to be simplified. For example, the same control signal may be provided to each data lane for receiving (e.g. fetching) the input data from the same thread of the sub-set of threads associated with each data lane. This again facilitates simpler control logic and architecture within the cross-lane permutation circuit.

In an embodiment, which thread of the sub-set of threads provides input data for a data lane for particular permutation processing pass is configured dynamically, and does not proceed according to a predetermined order among the passes. This is because in the case where the order for which data is output from the data lanes to the threads is predetermined (as discussed above) then, for each pass, the threads from which the input data is provided to the data lanes must be selected appropriately (accordingly) from the sub-set of threads associated with each respective data lane, so as to, for example, ensure that (at least one of) the input data lanes is provided with data that is required to be output to a thread in that pass.

Thus, in an embodiment, the input threads to the data lanes for a permutation processing pass are selected and set based on a (predetermined) order in which data is to be output to the threads over the sequence of permutation passes for a cross-lane instruction. In particular, the input threads to the data lanes for a permutation processing pass are selected and set based on the (predetermined) threads to which data will be output in that pass.

Hence, the input threads for the data lanes are in an embodiment selected and set based on the (e.g., predetermined) order in which data is to be output to the threads over the sequence of permutation passes in question, and, in an embodiment, the particular pass in the sequence that is being performed.

The input threads for the data lanes are in an embodiment (also) selected and set based on the cross-lane instruction that is being executed, and, in an embodiment, any parameters (operands) associated with the cross-lane instruction. In particular, the cross-lane instruction and the parameters associated with the cross-lane instruction may determine (indicate) from which threads the output threads will require data (e.g. from which threads data will be moved or copied to be provided to other threads as output data).

In each permutation processing pass the input threads are selected and set such that the input threads comprise at least the threads which are required to provide data to the output threads in that pass (e.g. by copying or moving that data) according to the cross-lane permutation instruction. The permutation operation for the permutation processing pass is determined (and performed) by the cross-lane permutation circuit to permute (e.g. move or copy) the input data between data lanes such that the data is then output to the required output threads.

Thus in an embodiment for a, and in an embodiment for each, permutation processing pass, the input threads to the data lanes (and in an embodiment also the permutation operation) are selected and set (or are determined) based on at least one of: the (predetermined) threads to which output data will be provided in that pass; and the threads from which the output threads require data according to the cross-lane instruction.

The cross-lane permutation circuit may comprise a control logic (circuit) for controlling and configuring the cross-lane permutation circuit to execute and when executing a cross-lane instruction. The control circuit is in an embodiment operable to control (configure) the cross-lane permutation circuit to perform each permutation processing pass, by setting which threads (execution lanes) data lanes of the cross-lane permutation circuit will provide input data to the data lanes in a pass, configuring (setting) the permutation circuit to perform the desired (required) permutation operation (i.e. controlling (configuring) the copying or moving of data between the data lanes), and/or setting which threads the output data from the data lanes is provided to in a pass.

The control circuit may also perform any determinations required to decide for each pass which input threads to set, which permutation operation to set, and which output threads to set. The determination of which input threads to set, and which permutation operation to set may be based on a (decoded) cross-lane instruction which is to be executed. The determination of which output threads to set may be independent of the cross-lane instruction which is to be executed (and may be based, instead, on the (pre-determined) order in which data is output among the passes in a set of passes).

The control circuit may be operable to perform the above determinations, and to provide the above control of the cross-lane permutation circuit in any suitable and desired manner.

The control circuit may be provided with information from (or may comprise) a counter which indicates the permutation processing pass that is currently being performed or that is to be performed next. For example, the control circuit in an embodiment keeps track of which passes have been performed (and/or the current pass that is to be configured), and in an embodiment controls the cross-lane permutation circuit appropriately for the current pass. For example, the control logic may update (e.g. increment) a counter or other indicator to indicate when a pass has completed or starts.

The control circuit may also be operable to decode cross-lane instructions (or to receive information regarding decoded cross-lane instructions), and to read (e.g. from a register) or receive operands relating to the cross-lane instruction in question The control circuit may also know (be informed of) which sub-set of threads of the thread group each data lane is associated with (and therefore which threads can be selected for providing input data for each of the data lanes). The control circuit may control (configure) the cross-lane permutation circuit in any suitable and desired manner. For example, the control circuit may provide control signals to the cross-lane permutation circuit when performing (each pass of) a cross-lane operation. The control circuit may also (or alternatively) set indications (e.g. flags) for use by the cross-lane permutation circuit when performing (each pass of) a cross-lane operation. For a control circuit that is operable to set indications (e.g. flags) for use by the cross-lane permutation circuit, the indications (flags) may comprise an indication of which thread an input data value should be obtained from for each data lane, for a particular pass. Such an indication may be used by a feeding circuit (logic) of the cross-lane permutation circuit. For example, the cross-lane permutation circuit may comprise a feeding circuit (logic) which is operable to obtain the input value for each of the data lanes when performing a permutation pass (e.g. by reading the input value from an appropriate register, such as a register associated with a thread). The feeding circuit may be configured to use the indications (flags) set by the control circuit when obtaining the input values (e.g. to identify which thread the input value for each data lane should be obtained from).

The indications (flags) set by the control circuit may also comprise an indication of the permutation operation that is to be performed (e.g. between which data lanes data values should be copied or moved, for each pass). For example, the indications (flags) may indicate from which data lane an input data value should be provided for use as an output data value of a particular data lane. Such an indication may be used by the cross-lane permutation circuit when performing the permutation operation (when providing output data values to the data lanes).

As mentioned above, the cross-lane permutation circuit of the technology described herein is used for executing cross-lane instructions, which may permute data values of a thread group. Some examples of cross-lane instructions (and operations) that in an embodiment can be performed using the cross-lane permutation circuit of the technology described herein will now be described.

The cross-lane permutation circuit may support one or more (or all) of the following cross-lane operations: a broadcast operation, a rotation operation, a shift operation, and an XOR operation. However, other types of cross-lane operations could also be supported if desired.

A broadcast operation is an operation in which a value from one thread is copied to plural other threads within the thread group (and in an embodiment to all threads in the thread group, including the thread originally having the value).

When performing a broadcast operation, the (control circuit of the) cross-lane permutation circuit will in an embodiment determine which thread contains the value to be broadcast, e.g. from an operand of the cross lane operation (which has been fetched by control circuit for performing the operation), and when performing each permutation processing pass, and provide that data value from the thread that contains the value to be broadcast as an input to a (single) data lane of the permutation circuit (the data lane to which the value is provided will be the data lane associated with the sub-set of threads which contains the thread whose value it to be broadcast). Then, in each pass, plural (and in an embodiment all) of the data lanes are in an embodiment provided with the value to be broadcast (copied from the lane into which that value was input). Hence, at the end (completion) of all of the passes in the set of passes for the broadcast operation, the output provided for plural (and in an embodiment all) of the threads is the value which was desired to be broadcast.

A rotation operation is an operation in which for each thread of the thread group, the value associated with that thread is transferred (moved) across the thread group width by a specified "rotation amount". The specified amount may comprise the number of threads across which the data is moved. If any value is moved beyond the end (of the width) of the thread group, then it will wrap around (back) to the start (of the width) of the thread group (such that the values are rotated around a closed loop). If the "rotation amount" is non-zero then data from each thread will be provided to a different thread of the thread group. If the "rotation amount" is zero, data is not moved between the threads and each thread retains its original data.

When executing a rotation operation, the (control circuit) of the cross-lane permutation logic in an embodiment determines the rotation amount (e.g. by obtaining (reading in from a memory location) an operand which specifies the rotation amount. Based on the rotation amount, the control circuit in an embodiment determines for each pass from which threads input data needs to be obtained for each data lane, and which permutation operation should be performed (i.e. to which data lanes the data should be provided as output data). The control logic may then set indications (e.g. flags), as discussed above, for use by the cross-lane permutation circuit when performing the passes. The control logic may also keep track of the passes, as discussed above.

A shift operation is similar to a rotation operation, except that the thread group is not treated as a closed loop, such that any values that are shifted beyond the end (of the width) of the thread group are not provided to any of the threads, and any thread which does not receive a shifted value will be provided with a default, e.g. predetermined (e.g. null) value.

Hence, in a shift operation a value associated with a thread is shifted across the thread group width by a specified "shift amount". The specified amount may comprise the number of threads across which the data is shifted. If the "shift amount" is non-zero then data will be shifted among the threads (provided the shift amount is less than the number of threads in the thread group). If the "shift amount" is zero, data is not shifted between the threads and each thread retains its original data.

When executing a shift operation, the (control circuit) of the cross-lane permutation circuit in an embodiment determines the shift amount (e.g. by obtaining (reading in from a memory location) an operand which specifies the shift amount. Based on the shift amount, the control circuit in an embodiment determines for each pass from which threads input data needs to be obtained for each data lane, and a permutation operation which should be performed (i.e. to which data lanes the data should be provided as output data). The control logic may then set indications (e.g. flags) or send control signals, as discussed above, for use by the cross-lane permutation circuit when performing the passes. The control logic may also keep track of the passes, as discussed above.

In an XOR operation, the destination thread for data transferred from a particular starting thread is determined based on a calculation that comprises XORing an identifier for the starting thread (execution lane) with an operand (an "XOR amount"). The result of the XOR calculation gives to the identity of the thread (execution lane) to which the data should be transferred (moved). If the "XOR amount" is zero, then the destination thread will be the same as the starting thread, and data therefore should not be moved or copied between the threads, so that each thread retains its original data.

Based on the XOR amount, the control circuit may determine for each pass from which threads input data needs to be obtained for each data lane, and a permutation operation which should be performed (i.e. to which data lanes the data should be provided as output data).

Once the threads (execution lanes) receive the output data from the data lanes of the cross-lane permutation circuit, they may use the output data for further processing in any suitable and desired manner, to produce a useful output (e.g. such as an image to be displayed on a display).

The technology described herein, in an embodiment, produces some useful output data, e.g. output data (from execution of a cross-lane instruction) for use in subsequent graphics processing operations. For example, the output data may comprise vertex or fragment data.

The output data may be further processed (in an embodiment for display), e.g. by a graphics processing pipeline, and/or provided to a display for display. Thus, in an embodiment, the generated output data is further processed, e.g. for display. In an embodiment, the generated output data is used to provide an image for display, e.g. is provided to a display for display.

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of output that a data processor (and processing pipeline) may be used to generate. For example, in the case of graphics processing, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of data processor and data processing system. It is particularly applicable to graphics processors and graphics processing systems. Thus in an embodiment, the data processor is a graphics processor (and pipeline).

For example, the data processor of the technology described herein may be a graphics processing unit, which is part of an overall graphics processing system that will include, e.g., and in an embodiment, a host processor that, e.g., executes applications that require graphics processing by the graphics processing unit. The host processor will send appropriate commands and data to the graphics processing unit to control it to perform graphics processing operations and to produce graphics processing (render) output required by applications executing on the host processor. To facilitate this, the host processor in an embodiment also executes a driver for the graphics processing unit and a compiler or compilers for compiling shader programs to be executed by the programmable execution unit of the graphics processing unit.

Although the above describes execution of shader programs in graphics processing units, the data processor of the technology described herein may be equally applicable to and can be used in other multi-threaded, processing units, and not just graphics processing units. The data processor of the technology described herein may, for example, be a more general data processing unit, such as a CPU (Central Processing Unit), if desired.

In an embodiment, the various functions of the technology described herein are carried out on a single data processing platform that generates and outputs data (e.g. rendered fragment data) to a suitable output (e.g. by writing to a frame buffer for a display device).

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and stages of the technology described herein may comprise a suitable processor or processors, controller or controllers, functional units, circuit, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share a processing circuit, etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that in embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in an embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

Embodiments of the technology described herein are described in the context of a graphics processor (a graphics processing unit (GPU)). The graphics processing unit may be operable to execute programs using execution threads which are grouped together in thread groups.

The graphics processing unit may comprise various processing units, some of which are shown in FIG. 1.

FIG. 1 shows schematically an arrangement of a graphics processing unit 101. As shown in FIG. 1, the graphics processing unit 101 can include a rasteriser 102, a thread spawner 103, a programmable execution unit 104, a varying interpolator 105, a texture mapper 106, and a blender 107.

During operation of the graphics processing unit 101 shown in FIG. 1, the rasteriser 102 will rasterise graphics primitives to be processed, to produce graphics fragments which are to be processed according to suitable programs (e.g. rendering (shading) programs).

The graphics fragments generated by the rasteriser 102 are provided to a thread spawner 103. (The fragments may also be subject to various tests, such as depth and stencil tests, before being provided to the thread spawner 103, with only those fragments that pass all the relevant tests being provided to the thread spawner 103).

The thread spawner 103 operates to spawn execution threads for execution by the programmable execution unit 104 for the fragments that it receives. It will, e.g., determine which program(s) are to be executed for a fragment, and then spawn threads to execute those programs. The threads are grouped into thread groups ("warps") such that instructions in a stream of instructions for a program can be executed in lockstep among the threads of the thread group.

The programmable execution unit 104 then executes the appropriate programs (instructions) for the threads that it receives from the thread spawner 103, to produce a desired output, such as a render output that results from processing the fragments generated by the rasteriser.

When performing processing for the threads, the programmable execution unit 104 may call upon other accelerator units, such as the varying interpolator 105, the texture mapper 106 and the blender 107 to perform specific graphics processing operations.

For example, the varying interpolator 105 may operate to interpolate values across graphics primitives, and, as part of this operation, create texture coordinates to be used for sampling graphics textures.

The texture mapper 106 may operate to sample graphics textures using texture coordinates, e.g. generated by the varying interpolator 105, and produce therefrom a filtered texture sample result (which it can then return to the programmable execution unit 104 for use, e.g. when shading sampling points).

The blender 107 may operate to blend, e.g., fragment shading results generated by the programmable execution unit with previously generated fragment shader results, such as results that are already stored in the tile buffer (in the case of a tile-based graphics processing unit) and/or the frame buffer.

Once the programmable execution unit has finished its processing for a given fragment (including using the responses, if any, from the varying interpolator 105, texture mapper 106 and blender 107), the resulting shaded fragment (sampling position) values can be written out to memory, e.g. for output.

The programmable execution unit 104 may comprises various functional units 108 for performing processing for the threads received from the thread spawner 103. The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load type units, store type units, etc. In an embodiment, the functional units (at least) comprise arithmetic units (i.e. units operable to perform arithmetic (mathematical) operations).

In the present embodiment, the programmable execution unit 104 also comprises a cross-lane permutation circuit 200 in the manner of the technology described herein. The programmable execution unit 104 is operable to use the cross-lane permutation circuit when performing cross-lane instructions (which require data to be copied or moved between threads of a thread group).

Figure 2:
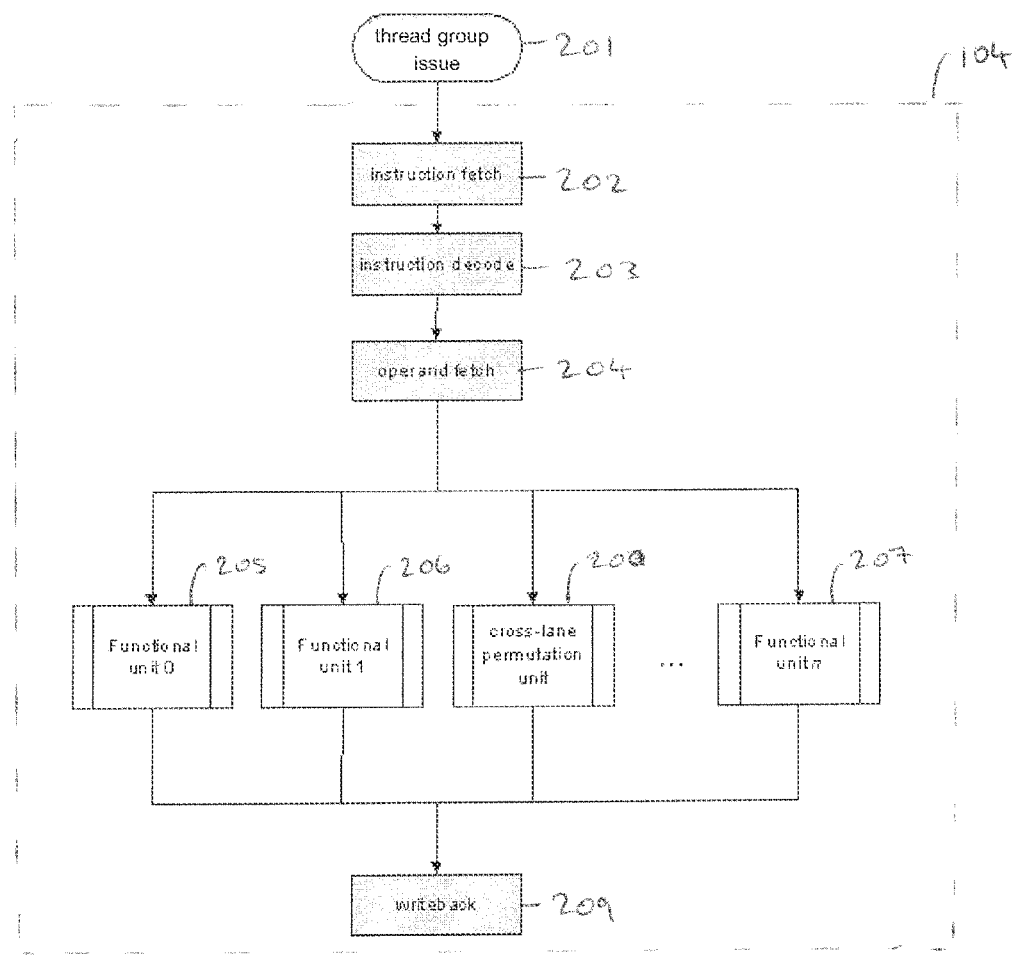
FIG. 2 shows the programmable execution unit of the graphics processing unit of FIG. 1 in more detail.

FIG. 2 shows the programmable execution unit 104 in more detail.

As shown in FIG. 2, the programmable execution unit 104 includes an appropriate instruction fetch circuit (stage) 202 that will fetch instructions to be executed for an issued thread group ("warp") 201 which has been spawned by the thread spawner 103. (The programmable execution unit 104 executes each instruction in a stream of instructions (in a program) for the threads in the thread group.)

The programmable execution unit 104 includes an instruction decoding circuit (stage) 203 that decodes the instructions. Decoding an instruction may comprise decoding the instruction into a format suitable for use when executing the instruction (by a functional unit or cross-lane permutation unit that is part of the graphics programmable execution unit, or by one of the accelerators), e.g. identifying and extracting the instruction opcode and any operands of the instruction.

After decoding the instruction, the execution unit 104 fetches any operands associated with the instruction, using an appropriate operand fetch circuit 204.

After the instruction has been decoded and the operands for the operation have been fetched, the programmable execution unit will then perform the processing operation that the instruction requires. This will be done using one of the functional units 205, 206, 207, one of the slave accelerators 105, 106, 107, or the cross-lane permutation circuit 200, depending on the operation required, as shown in FIG. 2.

In particular, if the instruction is a cross-lane operation instruction, the programmable execution unit will execute the instruction using the cross-lane permutation unit 200. If the instruction is not a cross-lane instruction, the programmable execution unit will execute the instruction using one or more of the functional units 205, 206, 207 of the programmable execution unit, or one of the slave accelerators 105, 106, 107 of the graphics processor.

The programmable execution unit also includes a writeback circuit (stage) 209 operable to, after executing an instruction, perform a writeback operation to write out the result from the execution of the instruction. The writeback operation may comprise writing out the result for all of the threads of a thread group for the instruction, such that the results (for all of the threads) are then available for use, e.g. when executing a subsequent instruction in the stream of instructions (program).

A thread group ("warp") (as issued by the thread spawner 103) will comprise a number of threads corresponding to the number of execution lanes of the programmable execution unit 104 of the graphics processor.

In the present embodiment, each thread group comprises sixteen threads, and so the functional units 205, 206, 207 of the programmable execution unit 104 each have sixteen execution lanes so as to support an entire thread group (operate across the entire width of the thread group).

Unlike the functional units 205, 206, 207 which comprise an execution lane for each of the sixteen threads of a thread group, in the present embodiments, the cross-lane permutation circuit 200 has only four data lanes (and is therefore "narrower"). Each data lane of the cross-lane permutation circuit is associated with a sub-set of a thread group, comprising four of the threads of the thread group (forming a "quad"). Each data lane can receive input data from, and can output data to, the threads (the "quad") of the sub-set of threads which it is associated with.

Figure 3:
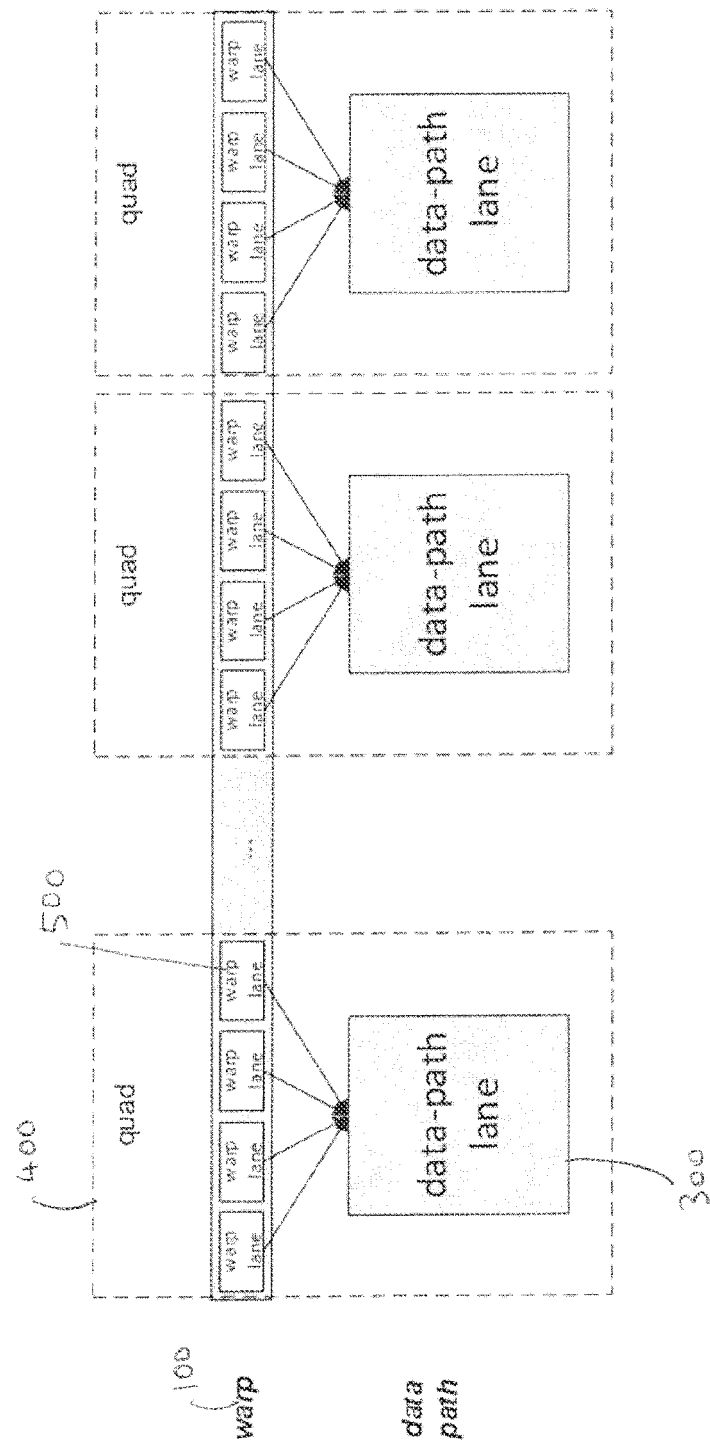
FIG. 3 illustrates how the threads of a thread group ("warp") are divided into sub-sets of threads, wherein each sub-set of threads is associated with a data lane of a cross-lane permutation circuit.

FIG. 3 illustrates this association of the data lanes of the cross-lane permutation circuit with respective sub-sets of threads of a thread group. As shown in FIG. 3, each data lane 300 of the cross-lane permutation circuit is associated with a sub-set of threads 400 (a "quad"), which comprises four contiguous threads 500 of a thread group 100.

The cross-lane permutation circuit 200 is operable to perform a permutation operation to permute (move or copy) data between its data lanes. The providing of input data values to the data lanes, permutation of data between the data lanes, and outputting of data values from the data lanes comprises a "permutation processing pass" performed by the cross-lane permutation circuit. By setting the appropriate input threads, permutation operation, and output threads, data can be permuted between the threads of a thread group using the cross-lane permutation unit.

The programmable execution unit is operable to, for each permutation processing pass, provide input data to each data lane 300 from a single thread 500 of the sub-set of threads 400 associated with the data lane 300, and to (after the cross-lane permutation circuit has performed a permutation operation) output data from each of the data lanes to a single thread 500 of the sub-set of threads 400 associated with the data lane 300 in question.

Since each data lane only provides output data for a single thread in each permutation pass, each pass will generate output data for only four threads. The execution unit will therefore perform multiple permutation processing passes (a sequence of permutation processing passes) when performing a cross-lane instruction, in order to provide output data for all of the threads in the thread group.

In the present embodiments, the cross-lane permutation circuit is configured to output data values from the data lanes to different threads in each pass (compared to other passes in the sequence of passes), and according to a predetermined order among the passes (over the sequence of passes). This allows data to be provided to all of the threads in a thread group in the minimum number of passes, and can also simplify the control of the cross-lane permutation circuit.

When performing the cross-lane instruction, for any given permutation processing pass, the cross-lane permutation circuit is operable to, for each data lane from which an output data value is provided to a thread, provide the output data value from the data lane 300 to the same thread 500 (i.e. the thread having the same position) of the sub-set of threads 400 that is associated with the data lane. This allows for simpler operational control of the cross-lane permutation circuit.

Figure 4:
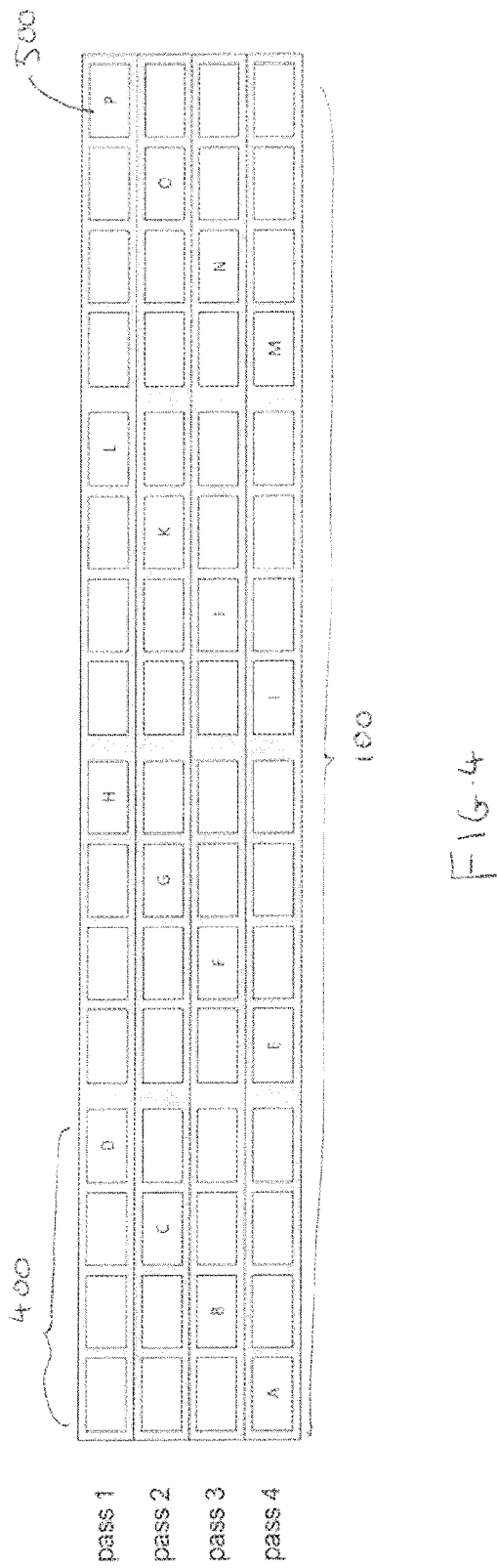
FIG. 4 illustrates how each pass performed by the cross-lane permutation circuit may provide output data for use by different threads of a thread group.

Such outputting of data values from the data lanes to the threads 500 of a thread group 100 is shown in FIG. 4 for a sequence of permutation processing passes when performing a cross-lane instruction.

As shown in FIG. 4, in the first pass ("pass 1"), for each data lane, the output data value is provided to a lowest (right-most) thread of the subset of threads 400 associated with the data lane. In the second pass ("pass 2"), the output data values are provided to the adjacent, next-lowest, thread of the subset of threads 400, and so on, for the third and fourth passes in the sequence of passes.

Thus, the data values are output to a different thread of the sub-set of threads in each pass, according to a predetermined order. Since there are four threads in each sub-set 400, four passes are therefore required in order to provide data for all sixteen of the threads in the thread group 100.

In contrast to the predetermined order that output data is provided to threads among the passes of the sequence of passes, the threads that provide the input data will not follow a predetermined order. The threads that provide the input data for the data lanes are instead configured (selected) dynamically depending on the cross-lane operation that is being performed. For each pass, the input threads are selected such the input threads contain the data which is required to be output to the (predetermined) output threads in that pass.

The cross-lane permutation circuit comprises a control circuit for configuring (controlling) the cross-lane permutation circuit, so that the appropriate input threads, permutation operation and output threads are used for each permutation processing pass.

In particular, the control circuit is operable to control (configure) the cross-lane permutation circuit to select input threads and perform a permutation operation for each pass based on the cross-lane instruction (and any operands associated with the cross-lane instruction), and based on the predetermined order in which data is to be output to the threads of a thread group over the sequence of permutation passes.

Figure 5:
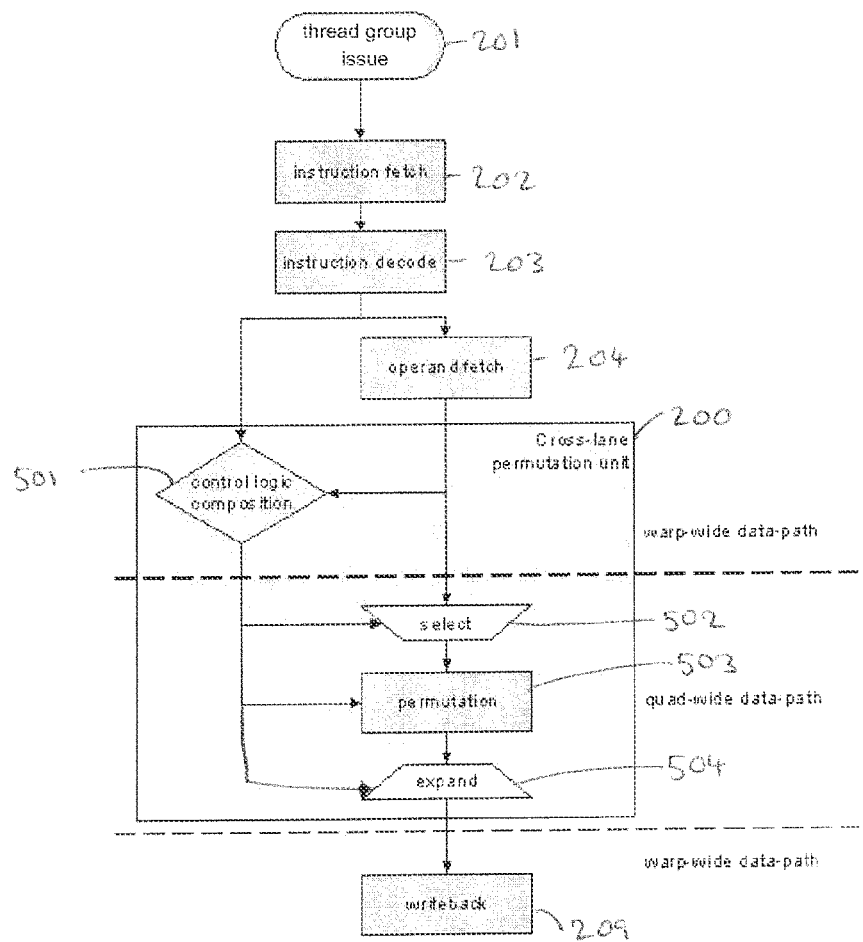
FIG. 5 shows the cross-lane permutation circuit in more detail.

FIG. 5 shows the cross-lane permutation circuit 200 in more detail.

As shown in FIG. 5, the cross-lane permutation circuit 200 includes a control circuit 501 that performs any determinations needed to configure (control) the cross-lane permutation circuit 200 for executing the cross-lane instruction, based on the decoded cross-lane instruction and any operand for that instruction.

In particular, for each pass of the set of passes for a cross-lane operation, the control circuit 501 configures (controls) an input thread selection (feeding) circuit 502 of the cross-lane permutation circuit to select and set the input threads for the data lanes for the pass in question, and configures (controls) a permutation circuit 503 of the cross-lane permutation circuit to permute data between the data lanes of the cross-lane permutation circuit 200 in the required manner.

The control circuit 501 also configures (controls) an output (expand) circuit 504 to set the output of data from the data lanes to the output threads for each pass, in accordance with the predetermined output sequence, for example, as shown in FIG. 4.

As shown in FIG. 5, the selection, permutation and outputting form, and are part of, a "four lane-wide datapath" within the cross-lane permutation circuit, in the sense that each data lane takes input data from only one thread of its associated thread "quad" and outputs data from that data lane for use by only one thread of its associated "quad" in a given pass, in contrast to the thread group (warp)—wide operation of the programmable execution units as a whole.

Once a permutation pass or passes are complete, the writeback circuit 209 will write back the output data to the threads of the thread group, for use when performing subsequent instructions (e.g. by writing the data from the registers associated with the data lanes to a result register from which each thread can access the output data that was intended for that thread).

Figure 6:
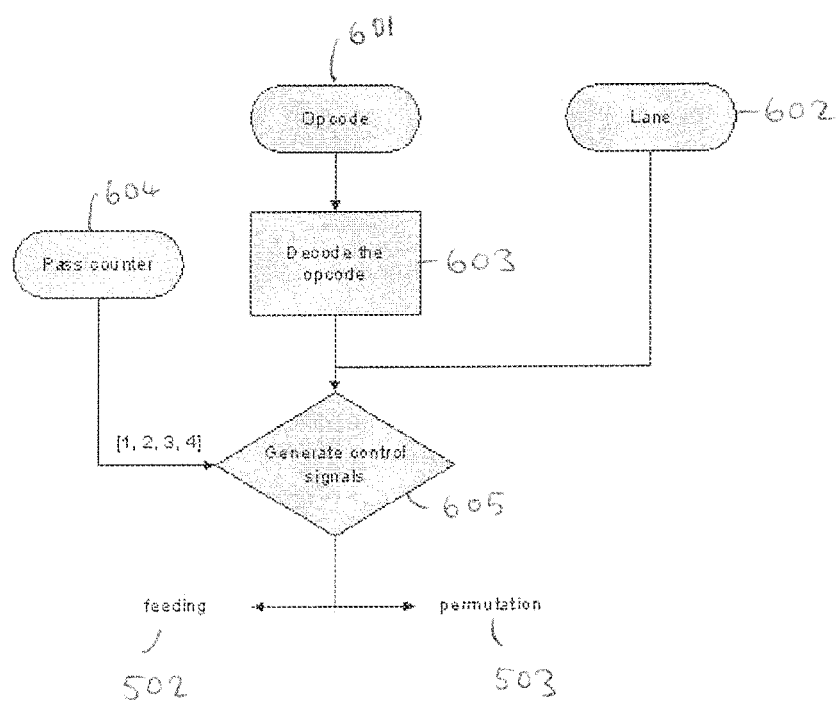
FIG. 6 illustrates how the control circuit of the cross-lane permutation circuit may control the cross-lane permutation circuit.

FIG. 6 shows the operation of the control circuit 501 of the cross-lane permutation circuit in more detail, and particularly the generation of control signals for controlling the input selection (feeding) and permutation circuits of the cross-lane permutation unit.

The control circuit receives the opcode (step 601) for the cross-lane instruction (as a result of the execution unit decoding the instruction (203 in FIG. 5)) and decodes the opcode (step 603).

The control circuit then performs a determination of which input threads should be selected for each pass, and determines a permutation operation for each pass, taking account of the opcode 601 and any operands ("lane" 602) for the cross-lane instruction, and the current pass of the sequence being performed (pass counter 604), and generates control signals (step 605) for the input selection (feeding) circuit (502) and the permutation circuit (503) accordingly.

(As the input threads and permutation required for a pass will depend on the cross-lane instruction (and operands), and also on which threads data will be output to in that pass according to the predetermined output order, the control circuit keeps track of the permutation processing passes using a pass counter 604, to ensure that the correct control signals are generated for each permutation processing pass.)

Figure 7:
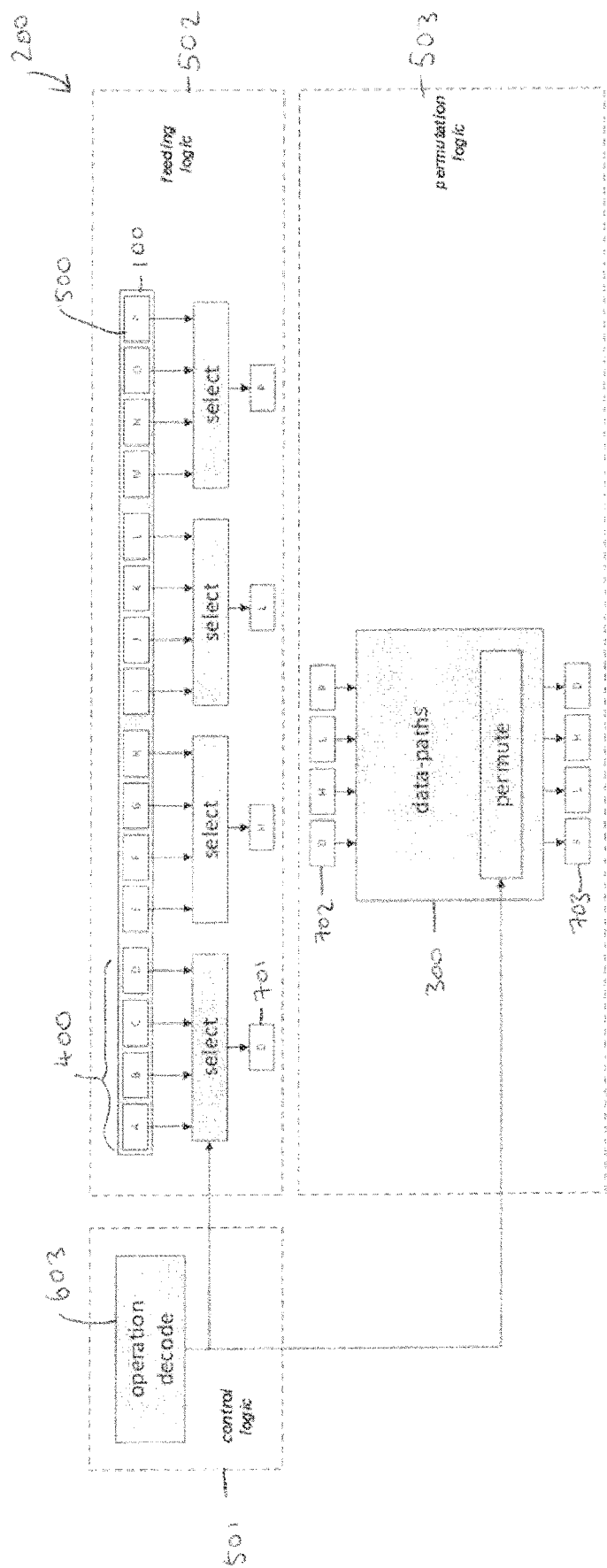
FIG. 7 shows the cross-lane permutation circuit in more detail.

FIG. 7 shows an embodiment of the cross-lane permutation circuit 200 in more detail.

As discussed previously, the control circuit 501 is operable to decode the op-code for the cross lane instruction (603) and configure (control) the cross-lane permutation circuit 200 accordingly.

As shown in FIG. 7, the control circuit 501 generates control signals for the input selection (feeding) circuit (logic) 502 in order to select for each data lane of the cross-lane permutation circuit a data value 701 from a thread 500 from the sub-set (quad) 400 of threads for that data lane. As mentioned previously, the data value for each data lane is selected from the same thread (i.e. thread having the same position) in the sub-set 400 of threads for the data lane. In the example shown, data values D, H, L and P are selected from the lowest (right-most) thread in the sub-set of threads for each data lane.

The selected data 701 is provided as input data 702 for each of the data lanes 300.

The control circuit 501 also generates control signals for the permutation circuit (logic) 503 to set that circuit to perform the desired permutation operation to permute data between the data lanes 300. In the example shown, the permutation operation moves the data values between the lanes so that the output data values 703 from the data lanes are P, L, H and D respectively.

For each permutation processing pass, the output data values 703 are provided to the predetermined threads for that pass by writing the data values to a suitable register.

Figure 8:
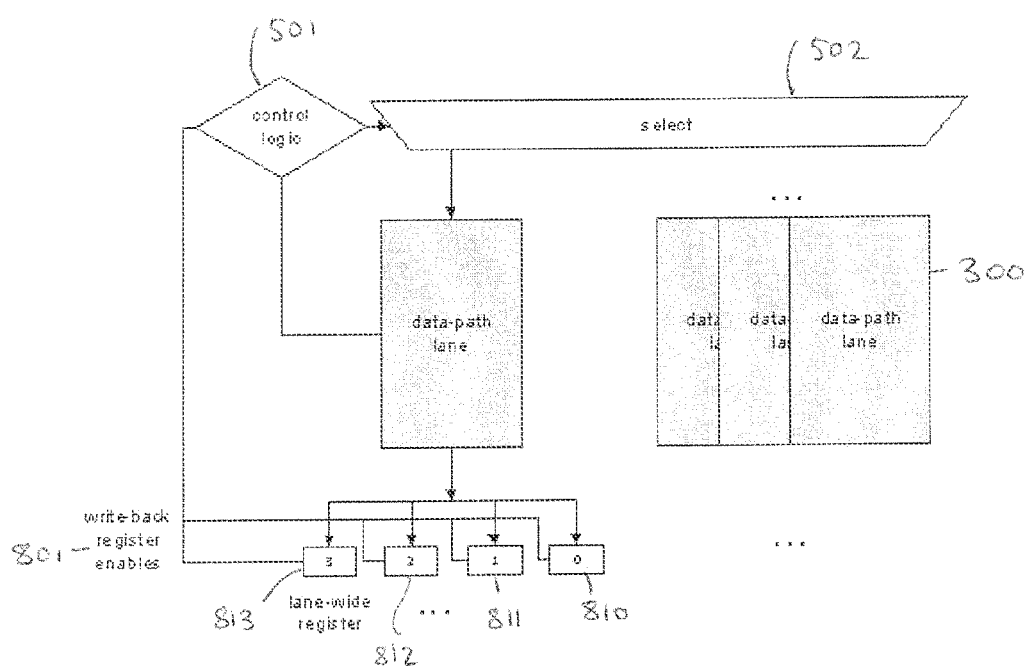
FIG. 8 illustrates how registers may be used by the cross-lane permutation circuit.

FIG. 8 shows in more detail how the control circuit controls the provision of output data to the threads from the data lanes by writing to suitable registers.

As shown in FIG. 8, each data lane is associated with four registers 810, 811, 812, 813 each of which are "lane-wide registers", and so have a width corresponding to the lane width such that each register can store a (single) data value that is output from its associated data lane 300.

Each register 810, 811, 812, 813 is used to store output data for (is associated with) a specific thread of the sub-set of threads associated with the data lane. In each permutation processing pass, the control circuit 501 will a generate control signal 801 to enable one of the registers 810, 811, 812, 813 corresponding to the predetermined output thread for that processing pass, such that data from the data lane is written to that enabled register. For example, in a first pass of the sequence of passes for a cross-lane instruction, the lowest, right-most register 810 (corresponding to a lowest, right-most thread of the sub-set of threads associated with the data lane) may be enabled. In a second pass, a next-lowest register 811 (corresponding to a next-lowest thread of the sub-set of threads associated with the data lane) may be enabled, and so on.

For legibility, in FIG. 8, registers 810, 811, 812, 813 are only shown for one of the data lanes however, in practice, each of the data lanes has a similar set of registers.

As discussed herein, some cross-lane operations (such as shift operations) may result in (or require) a fixed (e.g. default or null) value being provided to one or more threads of the thread group. Such a fixed value can be provided to a thread in any suitable manner. For example, when performing the processing pass which will provide an output for the thread in question, the register 810, 811, 812 or 813 associated with the thread in question may be provided with the fixed value (regardless of the output data 703 for the associated data lane). Alternatively, and in an embodiment, the data lane 300 in question could be provided with the default or null value during the permutation operation, such that the output data value 703 for the data lane is the default or null value.

FIGS. 9B to 9E show example cross-lane operations that can be performed using the cross-lane permutation circuit of the technology described herein. FIG. 9A shows example data (A-P) which may be associated with each thread 500 of a thread group 100 for which the cross-lane operation is to be performed.

For illustrative purposes, each thread 500 of the thread group 100 has a numerical identifier which is a number between 0 and 15. However, when executing threads using a data processor, the threads may be identified in any suitable manner.

FIGS. 9B to 9E show, for each permutation pass when performing a cross-lane operation: which input data value 702 is selected 606 by the input select (feeding) circuit for each data lane 300 ("feeding logic"); which output data value 703 is output 607 from each data lane 300 as a result of the permutation operation performed by the permutation circuit ("permutation logic"); and which threads are provided with the output data from the data lanes in each pass (the "result" columns).

As discussed previously, each data lane 300 of the cross-lane permutation circuit is associated with a different sub-set of the threads 500 of the thread group 100. For the examples shown in FIGS. 9B to 9E, the data lanes having numerical identifiers 3, 2, 1 and 0 are associated sub-sets 903, 902, 901 and 900 respectively.

As discussed previously, data is output to the threads in a predetermined order among the sequence of passes for the cross-lane operation. As shown in FIGS. 9B to 9E, data is output to the threads of each sub-set of threads from the lowest thread to the highest thread over the sequence of passes. For example, in the first pass, data is output to the lowest thread (the thread having the lowest numerical identifier) in the sub-set (i.e. to threads 12, 8, 4 and 0), whereas in the second pass data is output to the threads having an incrementally higher numerical identifier (i.e. to threads 13, 9, 5 and 1), and so on.

The input threads and the permutation operation depend on the cross-lane instruction that is being executed, and any operands associated with that cross-lane instruction. Specific examples for broadcast, rotation, shift and XOR instructions are shown in FIGS. 9B-9E respectively.

FIG. 9B shows a cross-lane operation which is a broadcast operation (for a cross-lane instruction which is a broadcast instruction).

In particular, in FIG. 9B, the value G from thread 9 is copied to all other threads of the thread group. The thread whose value is to be broadcast (i.e. thread 9) is indicated by the "select" operand.

As shown in FIG. 9B, in each pass, data lane 2 is provided with data value G (which is to be broadcast) from thread 9 (which is the second-lowest thread in the sub-set of threads associated with data lane 2). As discussed previously, the cross-lane permutation circuit is configured (controlled) such that, in a given pass, each data lane is provided with input data from the thread having the same position in their associated sub-set of threads, and so, in the example of FIG. 9B, all of the data lanes are provided with an input data value from the second-lowest thread (i.e. the input data for data lanes 3, 2, 1, and 0 is C, G, K and O respectively).

For each pass, the permutation operation comprises copying data value G to each of the other data lanes in the permutation operation. The output data 703 from the permutation operation is then output to the predetermined threads for that pass.

FIG. 9C shows a cross-lane operation which is a "rotation" operation. A rotation operation is an operation in which for each thread of the thread group, the value associated with that thread is transferred (moved) across the thread group width by a specified "rotation amount", so as to be provided to a different thread of the thread group. The specified "rotation amount" is an operand for the rotation operation, and indicates the number of threads across which the data is moved. If any value is moved beyond the end (of the width) of the thread group, then it will wrap around (back) to the start (of the width) of the thread group (such that the values are rotated around a closed loop). In the example shown in FIG. 9C, the "rotation amount" is 3, and so during the cross-lane operation, the data value from each thread is required to be rotated to the right across three threads (i.e. to a thread having a numerical identifier that is three lower). For example, the data value A from thread 15 is moved across three threads to thread 12.

For each pass of the sequence of passes for the cross-lane operation, the input threads are selected accordingly for the rotation operation, to ensure that the required data is output to the predetermined output threads for each pass.

For example, in the first pass, the input data for each data lane (A, E, I and M) is obtained from the highest thread in each sub-set of thread (i.e. threads 15, 11, 7 and 3). The permutation operation then moves the data between the data lanes so that the data can then be output to the correct thread (i.e. such that threads 12, 8, 4 and 0 receive data A, E, I and M) respectively.

FIG. 9C shows the normal (and normally intended) situation where the "rotation amount" is non-zero such that data from each thread is provided to a different thread of the thread group. As discussed above, if the "rotation amount" is zero, data would not be moved between the threads, and each thread would retain its original data (and the cross-lane permutation circuit would be configured accordingly).

FIG. 9D shows a cross-lane operation which is a "shift" operation. A shift operation is similar to a rotation operation, except that the thread group is not treated as a closed loop, such that any values that are shifted beyond the end (of the width) of the thread group are not provided to any of the threads, and any thread which does not receive a shifted value will be provided with a default, e.g. predetermined (e.g. null) value.

Hence, in a shift operation a value associated with a thread is shifted across the thread group width by a specified "shift amount", so as to be provided to a different thread of the thread group. The "shift amount" is an operand for the shift operation, and specifies the number of threads across which the data is shifted.

In the example shown in FIG. 9C, the "shift amount" is 7, and so during the cross-lane operation, the data value from each thread is required to be shifted to the right across seven threads (i.e. to a thread having a numerical identifier that is seven lower). For example, the data value A from thread 15 is moved across seven threads to thread 8.

Since the shift operation does not treat the thread group as a closed loop, some of the threads may be provided with output data which is a predetermined (e.g. null, or default) value. In the example shown in FIG. 9C, threads 15 to 9 are provided with default value X since there are no threads seven threads away to the left of these threads. The default value X is provided to these threads regardless of which output data value 703 is provided to the associated data lane during the permutation operation.

FIG. 9D shows an example where the "shift amount" is non-zero and so the data is accordingly shifted among the threads. As discussed above, if the "shift amount" is zero, data would not be shifted between the threads and each thread would retain its original data.

FIG. 9E shows a cross-lane operation which is an "XOR" operation. In an XOR operation, the destination thread for data transferred from particular starting thread is determined based on a calculation that comprises XORing an identifier for the starting thread with an operand (an "XOR amount"). The result of the XOR calculation gives to the identity of the thread to which the data should be transferred (moved). Based on the XOR amount, the control circuit may determine for each pass from which threads input data needs to be obtained for each data lane, and a permutation operation which should be performed (i.e. to which data lanes the data should be provided as output data).

In the example shown in FIG. 9E, the "XOR amount" is 5. The destination thread for data value A is therefore calculated by:

11^5=10 where ^ an XOR operation, and 11 is the identity of the thread which initially contained data value A. The result, 10, is the identity of the thread to which data value A should be transferred. Similar calculations can be performed to calculate the threads to which the other data values (B to P) should be transferred.

In each pass, the input threads and permutation operation are selected in order to provide the required output data to the predetermined threads for the pass.

FIG. 9D shows an example where the "XOR amount" is such that the destination thread differs from the start thread. However, if the "XOR amount" is zero, then the destination thread will be the same as the starting thread, and data therefore should not be moved or copied between the threads, so that each thread retains its original data.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processor configured to execute programs to perform data processing operations and in which execution threads executing a program to perform data processing operations are grouped together into thread groups in which the plural threads of a thread group each execute a set of instructions in lockstep;
the data processor comprising:
an instruction execution processing circuit configured to execute instructions to perform processing operations for execution threads executing a program, the execution processing circuit being configured as a plurality of execution lanes, each execution lane being configured to perform processing operations for a respective execution thread of a thread group; and
a cross-lane permutation circuit, the cross-lane permutation circuit comprising a plurality of data lanes, each data lane having an input and an output, the cross-lane permutation circuit having fewer data lanes than the number of execution lanes of the instruction execution processing circuit, wherein each data lane is associated with a different sub-set of one or more of the execution lanes of the instruction execution processing circuit, such that each execution lane is contained within only one of the sub-sets of execution lanes, wherein each data lane is configured to receive input data associated only with any execution lane of the sub-set of one or more execution lanes associated with said respective data lane and to provide output data for use only by any execution lane of said sub-set of one or more execution lanes associated with said respective data lane, wherein the cross-lane permutation circuit is configured to, for each data lane, allow a data value input to that data lane to be provided to zero or more of the other data lanes, such that the provided data value will be output by the zero or more other data lanes;
the method comprising, when executing an instruction for the threads of a thread group using the execution processing circuit, to provide a data value or values from a thread or threads of a thread group to another thread or threads of the thread group, performing one or more permutation processing passes using the cross-lane permutation circuit, wherein the data processor is configured to allow, for any given processing pass, any single execution lane of only the sub-set of one or more execution lanes associated with a data lane of the cross-lane permutation circuit to be selected to provide input data to the associated data lane, each permutation processing pass using the cross-lane permutation processing circuit comprising:
for each data lane of the cross-lane permutation circuit, selecting from any of the execution lanes of only the sub-set of one or more execution lanes associated with the data lane a single execution lane from which to provide input data to the data lane, and providing said input data from the selected single execution lane executing a corresponding execution thread of the thread group to the data lane;
the cross-lane permutation circuit performing a permutation operation using data provided to the data lanes, to provide as an output for at least one of the data lanes, a data value input to a different one of the data lanes; and
the cross-lane permutation circuit, after performing the permutation operation, for at least one of the data lanes, providing the data value output from the data lane for use by one of the execution lanes of only the sub-set of one or more execution lanes associated with that data lane executing a corresponding execution thread of the thread group.

2. The method of claim 1, wherein the permutation operation for a permutation processing pass comprises at least one of: retaining an input data value provided to a data lane such that an output data value for the data lane corresponds to the input data value that was provided to the data lane; copying an input data value from a data lane to at least one other data lanes; and moving an input data value from a data lane to another data lane.

3. The method of claim 1, wherein when executing an instruction using the cross-lane permutation circuit, the cross-lane permutation circuit performs a sequence of permutation processing passes;

wherein the number of passes in the sequence of permutation passes equals the number of execution lanes in the sub-set of one or more execution lanes associated with each data lane, wherein each sub-set of one or more execution lanes associated with each data lane comprises a same number of execution lanes.

4. The method of claim 1, wherein for any given permutation processing pass, for each data lane from which an output data value is provided to an execution lane, the output data value from the data lane is output to the same execution lane of the sub-set of one or more execution lanes that is associated with the data lane.

5. The method of claim 1, wherein when executing an instruction using the cross-lane permutation circuit, the cross-lane permutation circuit performs a sequence of permutation processing passes;
wherein for any given permutation processing pass, for each data lane from which an output data value is provided to a thread, the output data value from the data lane is provided to a different execution lane of the sub-set of one or more execution lanes associated with the data lane compared to other passes in the sequence of passes.

6. The method of claim 5, wherein for each data lane, the output data values are provided to the execution lanes of the sub-set of one or more execution lanes associated with the data lane over the sequence of permutation processing passes in a predetermined order.

7. The method of claim 1, wherein for any given permutation processing pass, for each data lane, the input data value for the data lane is provided from the same execution lane of the sub-set of one or more execution lanes that is associated with the data lane.

8. The method of claim 1, wherein the input data to the data lanes for a given permutation processing pass are selected based on at least one of:
predetermined threads to which output data will be provided in that pass; and the threads from which the predetermined threads will require data according to the cross-lane instruction.

9. A data processor configured to execute programs to perform data processing operations and in which execution threads executing a program to perform data processing operations are grouped together into thread groups in which the plural threads of a thread group each execute a set of instructions in lockstep;
the data processor comprising:
an instruction execution processing circuit configured to execute instructions to perform processing operations for execution threads executing a program, the execution processing circuit being configured as a plurality of execution lanes, each execution lane being configured to perform processing operations for a respective execution thread of a thread group; and
a cross-lane permutation circuit, the cross-lane permutation circuit comprising a plurality of data lanes, each data lane having an input and an output, the permutation circuit having fewer data lanes than the number of execution lanes of the instruction execution processing circuit, wherein each data lane is associated with a different sub-set of one or more of the execution lanes of the instruction execution processing circuit, such that each execution lane is contained within only one of the sub-sets of execution lanes, wherein each data lane is configured to receive input data associated only with any execution lane of the sub-set of one or more execution lanes associated with said respective data lane and to provide output data for use only by any execution lane of said sub-set of one or more execution lanes associated with said respective data lane, wherein the cross-lane permutation circuit is configured to, for each data lane, allow a data value input to that data lane to be provided to zero or more of the other data lanes, such that the provided data value will be output by zero or more of the other data lanes;
wherein the data processor is configured to use the cross-lane permutation circuit to perform one or more permutation processing passes to provide a data value or values from a thread or threads of a thread group to zero or more other threads of the thread group when executing an instruction for the threads of a thread group;
wherein the data processor is configured to allow, for any given processing pass, any single execution lane of only the sub-set of one or more execution lanes associated with a data lane of the cross-lane permutation circuit to be selected to provide input data to the associated data lane;
wherein the data processor is configured to, for each of the permutation processing passes, for each data lane of the cross-lane permutation circuit, select any single execution lane of only the sub-set of one or more execution lanes associated with the data lane to provide input data to the data lane of the cross-lane permutation circuit, and provide said input data from the selected single execution lane executing a corresponding execution thread of the thread to the data lane;
wherein the cross-lane permutation processing circuit is configured to, for each of the permutation processing passes, perform a permutation operation using the data provided to the data lanes, to provide as an output for at least one of the data lanes, a data value input to a different one of the data lanes; and
wherein the cross-lane permutation circuit is configured to, after performing the permutation operation, for at least one of the data lanes, provide the data output from the data lane for use by one of the execution lanes only of the sub-set of one or more execution lanes associated with that data lane executing a corresponding execution thread of the thread group.

10. The data processor of claim 9, wherein the cross-lane permutation circuit is configured to perform a permutation operation comprising at least one of: retaining an input data value provided to a data lane such that the output data value for the data lane corresponds to the input data value that was provided to the data lane; copying an input data value from a data lane to at least one other data lane; and moving an input data value from a data lane to another data lane.

11. The data processor of claim 9, wherein the cross-lane permutation circuit is configured to perform a sequence of permutation processing passes when executing an instruction;
wherein the number of passes in the sequence of permutation passes equals the number of execution lanes in the sub-set of one or more execution lanes associated with each data lane, wherein each sub-set of one or more execution lanes associated with each data lane comprises a same number of execution lanes.

12. The data processor of claim 9, wherein for any given permutation processing pass, the cross-lane permutation circuit is configured to, for each data lane from which an output data value is provided to an execution lane executing a corresponding thread, provide the output data value from the data lane to the same execution lane of the sub-set of one or more execution lanes that is associated with the data lane.

13. The data processor of claim 9, wherein the cross-lane permutation circuit is configured to perform a sequence of permutation processing passes when executing an instruction;
wherein for any given permutation processing pass, the cross-lane permutation circuit is configured to, for each data lane from which an output data value is provided to a thread, provide the output data value from the data lane to a different execution lane of the sub-set of one or more execution lanes associated with the data lane compared to other passes in the sequence of passes.

14. The data processor of claim 13, wherein the cross-lane permutation circuit is configured to provide output data values to the execution lanes of the sub-set of one or more execution lanes associated with a data lane in a predetermined order over the sequence of permutation processing passes.

15. The data processor of claim 9, wherein the data processor is configured to, for any given permutation processing pass, for each data lane, provide the input data value for the data lane from the same execution lane of the sub-set of one or more execution lanes that is associated with the data lane.

16. The data processor of claim 9, wherein the data processor is configured to select input data to the data lanes for a given permutation processing pass based on at least one of: predetermined threads to which output data will be provided in that pass; and the threads from which the predetermined threads will require data according to the cross-lane instruction.

17. The data processor of claim 9, wherein the cross-lane permutation circuit comprises a control circuit configured to control the cross-lane permutation circuit to perform a permutation processing pass by setting which threads will provide input data to the data lanes in a pass, and configuring the permutation circuit to perform a permutation operation for the pass.

18. The data processor of claim 9, wherein the cross-lane permutation circuit comprises a control circuit, wherein the control circuit comprises a counter which is incremented during execution of an instruction to keep track of the permutation processing passes.

19. The data processor of claim 9, wherein the cross-lane permutation circuit comprises a control circuit, wherein the control circuit is configured to control which execution lanes the output data from the data lanes is provided to in a pass based on a predetermined order in which data is to be output to the execution lanes in a sequence of passes.

20. A non-transitory computer readable storage medium storing computer software code which when executing on a processor performs a method of operating a data processor configured to execute programs to perform data processing operations and in which execution threads executing a program to perform data processing operations are grouped together into thread groups in which the plural threads of a thread group each execute a set of instructions in lockstep;
the data processor comprising:
an instruction execution processing circuit configured to execute instructions to perform processing operations for execution threads executing a program, the execution processing circuit being configured as a plurality of execution lanes, each execution lane being configured to perform processing operations for a respective execution thread of a thread group;
and
a cross-lane permutation circuit, the cross-lane permutation circuit comprising a plurality of data lanes, each data lane having an input and an output, the cross-lane permutation circuit having fewer data lanes than the number of execution lanes of the instruction execution processing circuit, wherein each data lane is associated with a different sub-set of one or more of the execution lanes of the instruction execution processing circuit, such that each execution lane is contained within only one of the sub-sets of execution lanes, wherein each data lane is configured to only receive input data associated only with any execution lane of the sub-set of one or more execution lanes associated with said respective data lane and to provide output data for use only by any execution lane of said sub-set of one or more execution lanes associated with said respective data lane, wherein the cross-lane permutation circuit is configured to, for each data lane, allow a data value input to that data lane to be provided to zero or more of the other data lanes, such that the provided data value will be output by the zero or more other data lane or lanes;
the method comprising, when executing an instruction for the threads of a thread group using the execution processing circuit, to provide a data value or values from a thread or threads of a thread group to another thread or threads of the thread group, performing one or more permutation processing passes using the cross-lane permutation circuit, wherein the data processor is configured to allow, for any given processing pass, any single execution lane of only the sub-set of one or more execution lanes associated with a data lane of the cross-lane permutation circuit to be selected to provide input data to the associated data lane, each permutation processing pass using the cross-lane permutation processing circuit comprising:
for each data lane of the cross-lane permutation circuit, selecting from any of the execution lanes of only the sub-set of one or more execution lanes associated with the data lane a single execution lane from which to provide input data to the data lane, and providing said data from the selected single execution lane executing a corresponding execution thread of the thread group to the data lane;
the cross-lane permutation circuit performing a permutation operation using data provided to the data lanes, to provide as an output for at least one of the data lanes, a data value input to a different one of the data lanes; and
the cross-lane permutation circuit, after performing the permutation operation, for at least one of the data lanes, providing the data output from the data lane for use by one of the execution lanes of only the sub-set of one or more execution lanes associated with that data lane executing a corresponding thread of the thread group.

* * * * *